(12) United States Patent
Hotch et al.

(10) Patent No.: US 6,494,354 B2
(45) Date of Patent: *Dec. 17, 2002

(54) DOWEL DRIVING HEAD DEVICE AND DOWEL DRIVING MACHINE

(75) Inventors: Koichi Hotch, Hamamatsu (JP); Takeo Matsushima, Hamamatsu (JP)

(73) Assignee: Yasaka Company Limited, Shizuoka-ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/460,100

(22) Filed: Dec. 13, 1999

(65) Prior Publication Data

US 2002/0011507 A1 Jan. 31, 2002

(30) Foreign Application Priority Data

| Dec. 11, 1998 | (JP) | 10-375105 |
| Nov. 4, 1999 | (JP) | 11-314116 |
| Nov. 4, 1999 | (JP) | 11-314117 |

(51) Int. Cl.[7] ............................................. B27F 4/00
(52) U.S. Cl. ..................... 227/109; 227/26; 227/27; 227/117; 227/118
(58) Field of Search ........................... 227/109, 27, 14, 227/21, 26, 69, 70, 71, 117, 118; 144/353, 3.1; 221/265, 268, 277

(56) References Cited

U.S. PATENT DOCUMENTS

| 1,074,158 A | * | 9/1913 | Bell et al. ................... 227/118 |
| 2,722,248 A | * | 11/1955 | De Anguera ................. 227/69 |
| 3,507,438 A | * | 4/1970 | Mullin ........................ 227/14 |
| 3,601,301 A | * | 8/1971 | Backus ....................... 227/14 |
| 3,891,134 A | * | 6/1975 | Kratsch et al. ............... 227/14 |
| 4,519,534 A | * | 5/1985 | White ........................ 227/117 |
| 4,834,153 A | * | 5/1989 | Stegherr ..................... 144/353 |
| 5,067,632 A | * | 11/1991 | Aubry ........................ 221/268 |
| 5,276,953 A | * | 1/1994 | Hatch ........................ 144/353 |
| 5,417,264 A | * | 5/1995 | Ganner ........................ 227/26 |

* cited by examiner

Primary Examiner—Scott A. Smith
Assistant Examiner—Nathaniel Chukwurah
(74) Attorney, Agent, or Firm—Arent Fox Kinter Plotkin & Kahn

(57) ABSTRACT

A dowel driving machine arranged such that a single head is provided with a single shaft hole and a plurality of receiving holes, for individually receiving different kinds of dowels, arranged side by side in parallel, and that selection is made out of the different kinds of dowels of different diameters and lengths supplied from chutes to respective receiving holes. As a result, different kinds of dowels can be driven easily without requiring extra work of changing a setup in spite of reducing the size of the device.

11 Claims, 24 Drawing Sheets

DOWEL DRIVING HEAD DEVICE AND DOWEL DRIVING MACHINE

BACKGROUND OF THE INVENTION

This invention relates to a dowel driving head device and a dowel driving machine for driving dowels into end surfaces of planks or square lumbers.

One arrangement based on the prior art is shown in FIG. 1. In FIG. 1, a shaft hole 2 is bored through a head 1 of a dowel driving head device in the front-rear direction (in right-left direction in the figure), and an ejection pipe 3 is attached to the front part of the shaft hole 2. A relay hole 4 of a large diameter intersecting the axis of the shaft hole 2 at right angles is formed behind the ejection pipe 3. A receiving hole 5 is formed above the relay hole 4 to meet the shaft hole 2 and the ejection pipe 3 from above at right angles. A chute 6 for supplying dowels D is connected to the top of the receiving hole 5.

A shaft for push-moving the dowel D forward (to the right) is slidably fit in the shaft hole 2. A delivery shaft 7 is rotatably fit in the axial part of the relay hole 4. A delivery hole 7a is bored in the delivery shaft 7 to intersect its axis at right angles. The dowel D supplied from the receiving hole 5 is fit in the delivery hole 7a. An adjustment screw 8 determines the position of the dowel D coming from the receiving hole 5 and fitting in the delivery hole 7a.

As the delivery shaft 7 is rotated by 90 degrees about its axis, the dowel D supplied from the receiving hole 5 is rotated so that it is directed to the axes of the shaft hole 2 and the ejection pipe 3. In that state, as the shaft 9 is moved forward (right), the dowel D is ejected from the ejection pipe 3 forward and press-fit into the dowel hole H of the work located in front.

With the conventional arrangement, since a single head drives a single kind of dowels, in order to drive dowels of a different diameter for example, another head for that purpose must be provided in parallel, or components such as the ejection pipe 3, chute 6, and delivery shaft 7 must be replaced with those corresponding to the different diameter. This is disadvantageous because of increased size of the device and additional work for the replacement. This invention is arranged to provide a dowel driving head device and a dowel driving machine capable of driving more than one kinds of dowels using a single head without increasing/the size of the device.

SUMMARY OF THE INVENTION

The present invention has been made in view of the above problems. The present invention is arranged such that a single head is provided with a single shaft hole and a plurality of receiving holes, for individually receiving different kinds of dowels, arranged side by side in parallel, and that selection is made out of the different kinds of dowels of different diameters and lengths supplied from chutes to respective receiving holes.

As a result, different kinds of dowels can be driven easily without requiring extra work of changing a setup in spite of reducing the size of the device, Various other advantages are obtainable according to various embodiments of the present invention.

One such advantage is that, since the stopper device is provided to hold and release the passage of the dowels in the respective receiving holes, selected dowels are driven in a stabilized manner.

Another advantage is that, since transfer passages are provided to interconnect the front parts of the receiving holes and the front part of the shaft hole, dowels of different lengths can be smoothly moved to the shaft hole while reducing the head size.

Furthermore, since guides for restricting the lateral movement of the dowels are detachably attached to parts of the transfer passages on the receiving holes side, dowels of different lengths can be fed to the shaft hole in a stabilized manner.

Also, since the inside diameter of the front end of the cylindrical main part as the ejection pipe is made slightly smaller than the diameter of the dowel and the front circumferential wall of the cylindrical main part is divided in the circumferential direction, the dowels of different diameters can be ejected accurately to the axis of the dowel hole.

Furthermore, since the attachment table is supported for vertical sliding to the X-axis movement table moving along the rear part of the surface table through the vertical direction guide rod, the attachment table can be moved in two axes with a simple structure. Since the attachment table is provided with the hole boring device, with the paste spouting nozzle, and with the dowel driving head device moving to and away from the dowel hole in the work in the direction crossing the dowel hole axis, a series of steps from forming the dowel hole to dowel driving can be performed quickly.

BRIEF DESCRIPTION OF THE INVENTION

Other objects, features and advantages of the present invention will be apparent from the detailed description of the preferred embodiments of the invention which follows, when considered in light of the accompanying drawings, in which.

DETAILED DESCRIPTION OF THE PREFERRED EMBODIMENTS OF THE INVENTION

Figure 1:
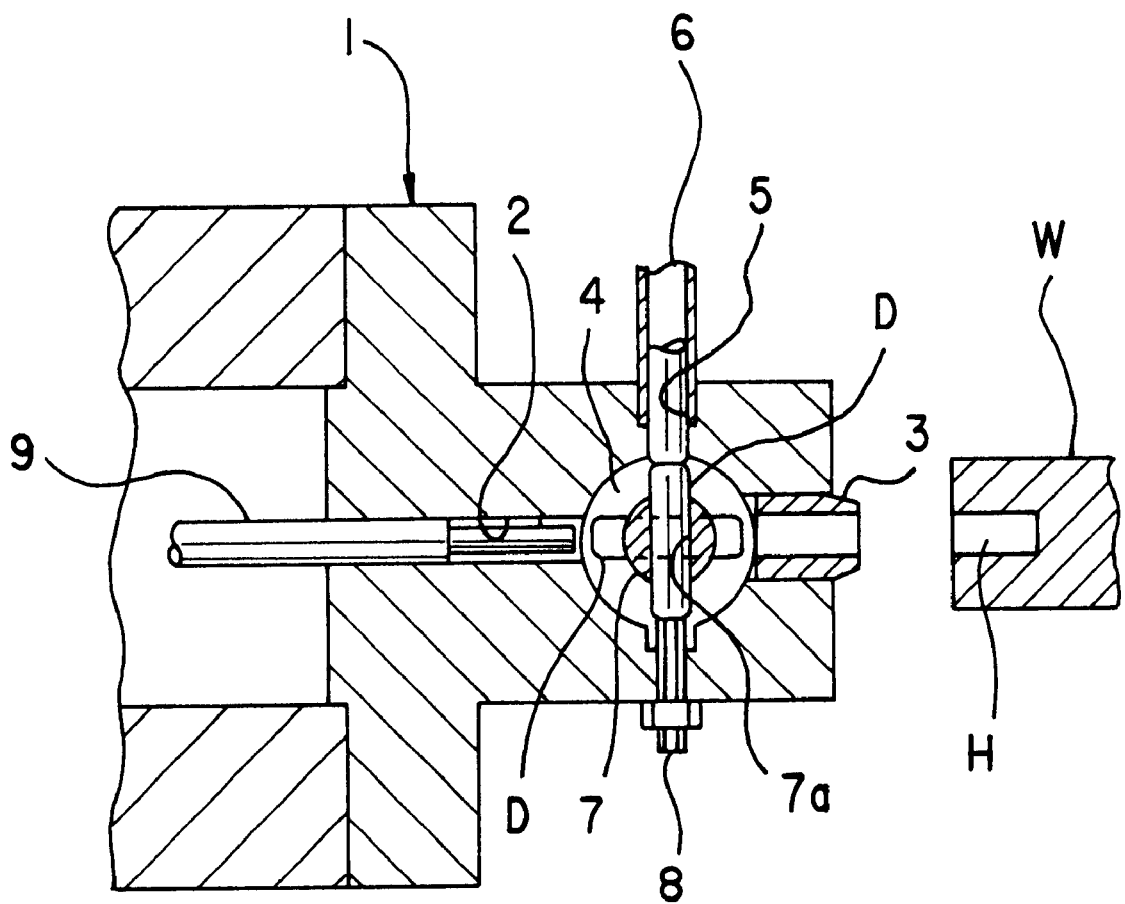
FIG. 1 is a cross-sectional view of an essential part of a conventional dowel driving head device as an example.
Figure 2:
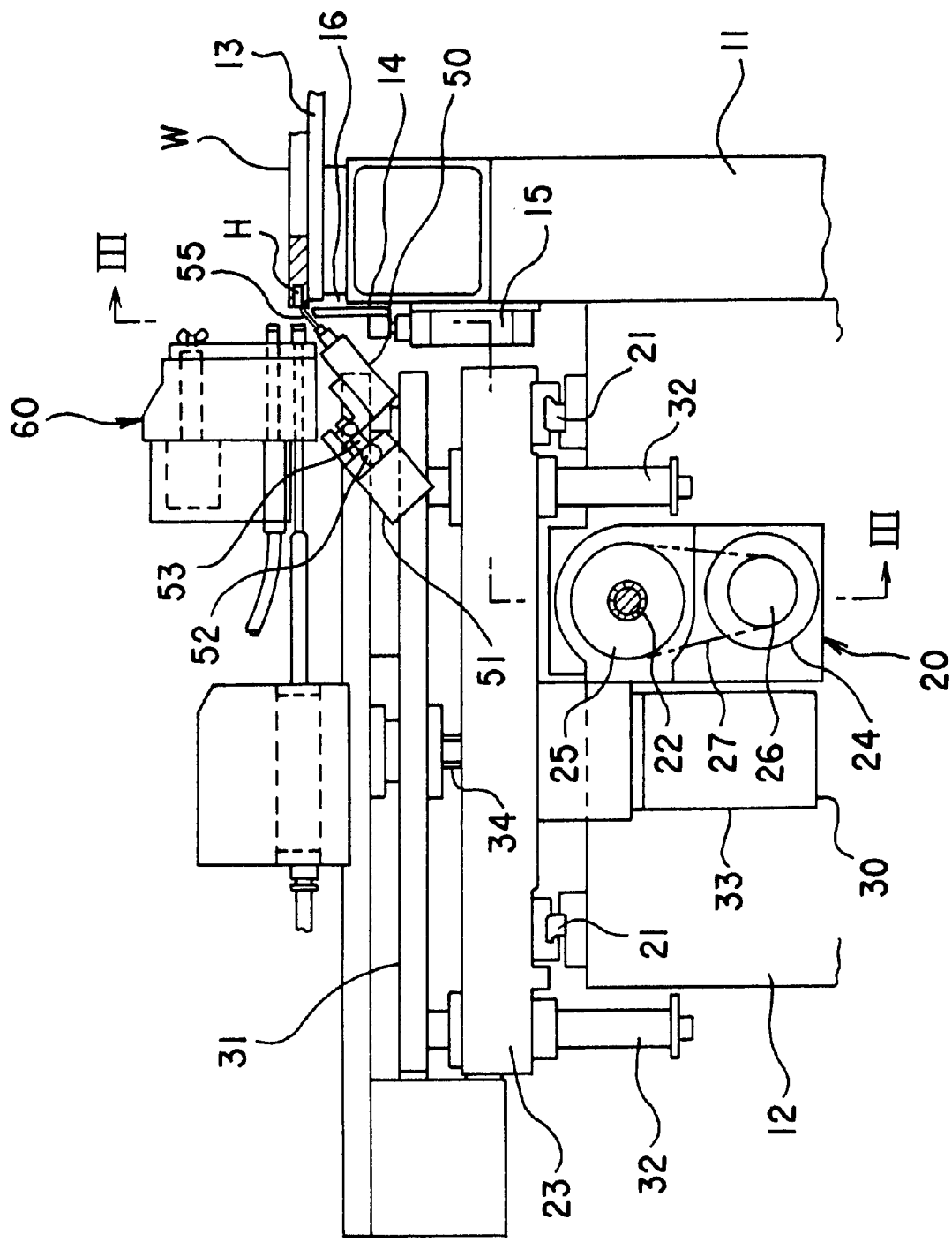
FIG. 2 is a side view, partially in cross section, of a dowel driving machine of the invention.
Figure 3:
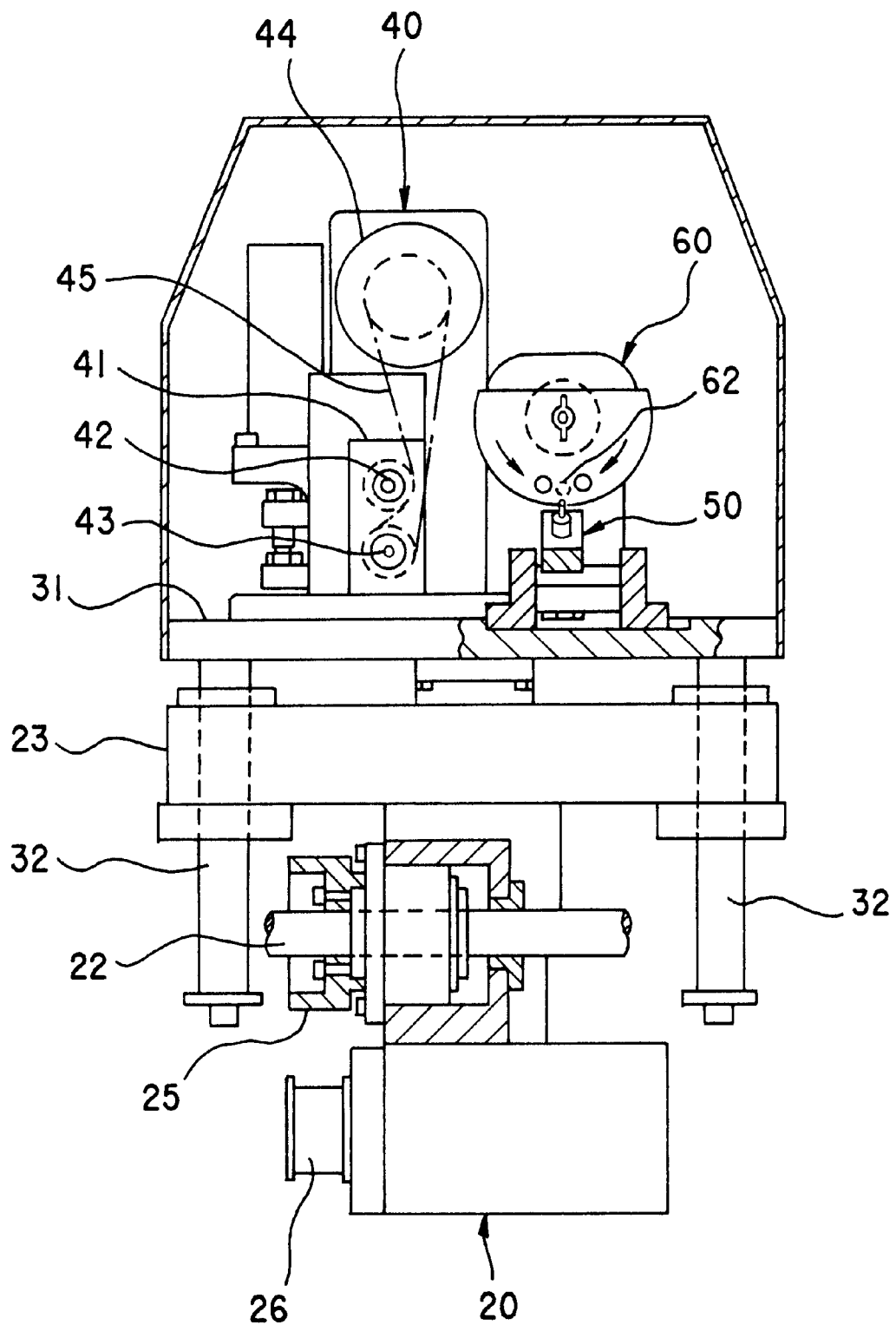
FIG. 3 is an explanatory cross-sectional front view taken along the line III—III in FIG. 2.

The invention will be described by means of embodiments. FIGS. 2 and 3 show a dowel driving machine 10 comprising; a front frame 11 on the tight hand side to which is attached a surface plate 13 for carrying a work W, a rear frame 12 to which is attached an attachment table 31 moved in both lateral (X) and vertical (Y) directions along the rear surface of the surface plate 13 by means of an X-axis movement device 20 and a Y-axis movement device 30. To the attachment table 31 are attached; a hole boring device 40 (FIG. 3), a paste spouting device 50, and a dowel driving head device 60.

A plate-shaped rear ruler (stopper) 14 moved in vertical directions with a cylinder 15 is disposed on the rear surface side of the front frame 11. The rear ruler 14 is disposed slightly apart rearward from the rear end (left end in FIG. 2) of the surface plate 13 to leave a gap 16 so that cutting chips and dust on the surface plate 13 can fall down through the gap 16.

The X-axis movement device 20 is constituted as follows: Two X-axis rails 21 extending in the X-axis direction are secured to the top of the rear frame 12. A feed screw 22 extending in the X-axis direction is rotatably disposed between the X-axis rails 21. A rectangular X-axis movement table 23 is slidably disposed on the X-axis rails 21. Under the X-axis movement table 23 are disposed an X-axis motor 24 and a feed pulley 25 having a nut rotated with the X-axis motor 24. The feed pulley 25 is screw-fit over the feed screw 22. The X-axis movement table 23 is reciprocated along the rear surface of the surface table 13 by rotating the feed pulley 25 in normal and reverse directions through the X-axis motor 24. A drive pulley 26 is secured on the output shaft of the motor 24. A timing belt 27 is routed between the drive pulley 26 and the feed pulley 25.

The Y-axis movement device 30 is arranged as follows: The rectangular attachment table 31 is disposed above the X-axis movement table 23. Four guide rods 32 secured to and extending downward from the four corners of the attachment table 31 are made to fit for vertical sliding in the four corners of the X-axis movement table 23. An elevator screw 34 rotated with a Y-axis motor 33 projects upward from the center of the X-axis movement table 23. The top part of the elevator screw 34 screw-engages with the central part of the attachment table 31. The attachment able 31 is moved in up and down directions relative to the X-axis movement table 23 by rotating the elevator screw 34 in normal and reverse directions by means of the Y-axis motor 33.

The hole boring device 40 is disposed in the left part (forward movement side) in FIG. 3 of the attachment table 31. The paste spouting device 50 and the dowel driving head device 60 are disposed in the right part (reverse movement side) of the attachment table 31. The hole boring device 40 is constituted as follows: A case 41 is supported for vertical movement on the attachment table 31. Drills 42 and 43 of larger and smaller diameters (for example 8 mm and 6 mm) individually moved back and forth with a drill cylinder (not shown) are attached to the case 41, one over the other, and rotated with a drill motor 44. Dowel holes H (FIG. 2) are bored in work W placed on the surface table 13 after matching the height of the drill 42 or 43, whichever to be used, with the height of an ejection pipe 75, to be described later, by moving the case 41 in the vertical direction. A chain 45 transmits power of the drill motor 44 to the drill 42 or 43.

The paste spouting device 50 for supplying paste to the dowel hole H bored with the drill 42 (or 43) in the work W is constituted as follows. As shown in FIG. 2, a cylinder 51 is disposed for rotary adjustment about an X-axis in the front part of the attachment table 31 by means of a pivot bolt 52 and a bracket 53. An elongate paste spouting nozzle 55 is attached to the cylinder 51 through a paste spouting valve 54 (not shown). The paste spouting nozzle 55 is tilted up about the pivot bolt 52 toward the axis of the dowel hole H to direct its spout to the inlet of the dowel hole H facing the dowel driving head device 60. In that state, when highly viscous paste is spouted, the cylinder 51 is extended (the state of FIG. 2), the nozzle 55 approaches the inlet of the dowel hole H, and paste is spouted from-the paste spouting nozzle 55. Then, the cylinder 51 is retracted to cause the paste spouting nozzle 55 to move away from the dowel hole H. When a paste of a low viscosity is to be spouted, the paste is spouted toward the dowel hole H with the paste spouting nozzle 55 remaining in the state retracted from the dowel hole H, with the cylinder 51 also in the retracted position.

The dowel driving head device 60 is arranged to be capable of driving more than one kinds of dowels with a single head. This will be described in detail by means of the first to fifth embodiments. FIGS. 4 to 11 show the first and the second embodiments corresponding to the claims 1, 2 to 7.

In FIGS. 4 to 9 are shown; a dowel driving head device 60-1 of the first embodiment, and its head 61. The head 61 is formed in a cylindrical column shape and attached to the attachment table 31 as described before. The head 61 is provided with; a shaft hole 62 (FIG. 5) bored through the peripheral lower part, and two receiving holes (FIG. 4) of different diameters, for example a first and a second receiving holes 63 and 64 respectively of 6 mm and 8 mm in diameter bored through the peripheral both side parts, respectively in the front-rear direction (right-left direction in FIGS. 4 and 5). The shaft hole 62 and the first and second receiving holes 63, 64 are located at 90-degree circumferential angular intervals about the axis of the head 61. A shaft 66 to be moved back and form with a hydraulic or pneumatic ejection cylinder 65 is fit in the shaft hole 62. The lower end of a first chute 67 for arranging and causing to flow down 6 mm diameter dowels D1 in series is fit in the first receiving hole 63, while a second chute 68 for arranging and causing to flow down 8 mm diameter dowels D2 in series is fit in the second receiving hole 64. Incidentally, the circumferential angular intervals of the receiving holes 63, 64 relative to the shaft hole 62 may be less than or more than 90 degrees.

Here, the distance from the drills 42, 43 of the hole boring device 40 to the paste spouting nozzle 55 of the paste spouting device 50, and the distance from the drills to the shaft hole 62 in the X-axis direction are made the same as the pitch (90 mm in this example) of the dowel holes bored in the work W, so that the boring of one dowel hole H with the drill 42 (or 43) may be carried out simultaneously with supply of paste and drive of the dowel into another dowel hole H already bored with the drill 42 (or 43).

A selective feed device 70 is attached to the head 61. That is, a rotary plate 71 having a through hole 72 in the peripheral part is disposed on the front side (right hand side in FIG. 4) of the head 61 and connected to a drive shaft 73 provided in the axial part of the head 61. The drive shaft 73 is rotated in normal and reverse directions with a feed motor 74 attached to the back side of the head 61 to rotate the rotary plate 71 clockwise and counterclockwise as shown with arrows (C1, C2) in FIG. 6, so that the through hole 72 is connected by turns to a selected receiving hole, for example the first receiving hole 63, and the shaft hole 62.

The ejection pipe 75 is fit in the through hole 72 in the rotary plate 71. The front end part of the ejection pipe 75 is tapered so that its inside diameter is slightly smaller than the outside diameter of the smaller dowel D1. The front peripheral wall of the ejection pipe 75 is divided in the circumferential direction with a plurality of slits. An elastic ring 76 is fit over the divided periphery. The elasticity of the elastic ring 76 and the circumferentially divided peripheral wall causes the initial inside diameter of the front end part of the ejection pipe 75 to be slightly smaller than the outside diameter of the small dowel D1. This makes it possible that, even if the diameters of the dowels coming to the through hole 72 are different, the dowels (D1, D2) are aligned on the axis of the shaft hole 62 (dowel hole H) and smoothly passed when they are pushed with the shaft 66. Incidentally, the elastic ring 76 is an O-ring made of a plastic material or rubber having elasticity, or a coil spring made of a spring material.

Figure 5:
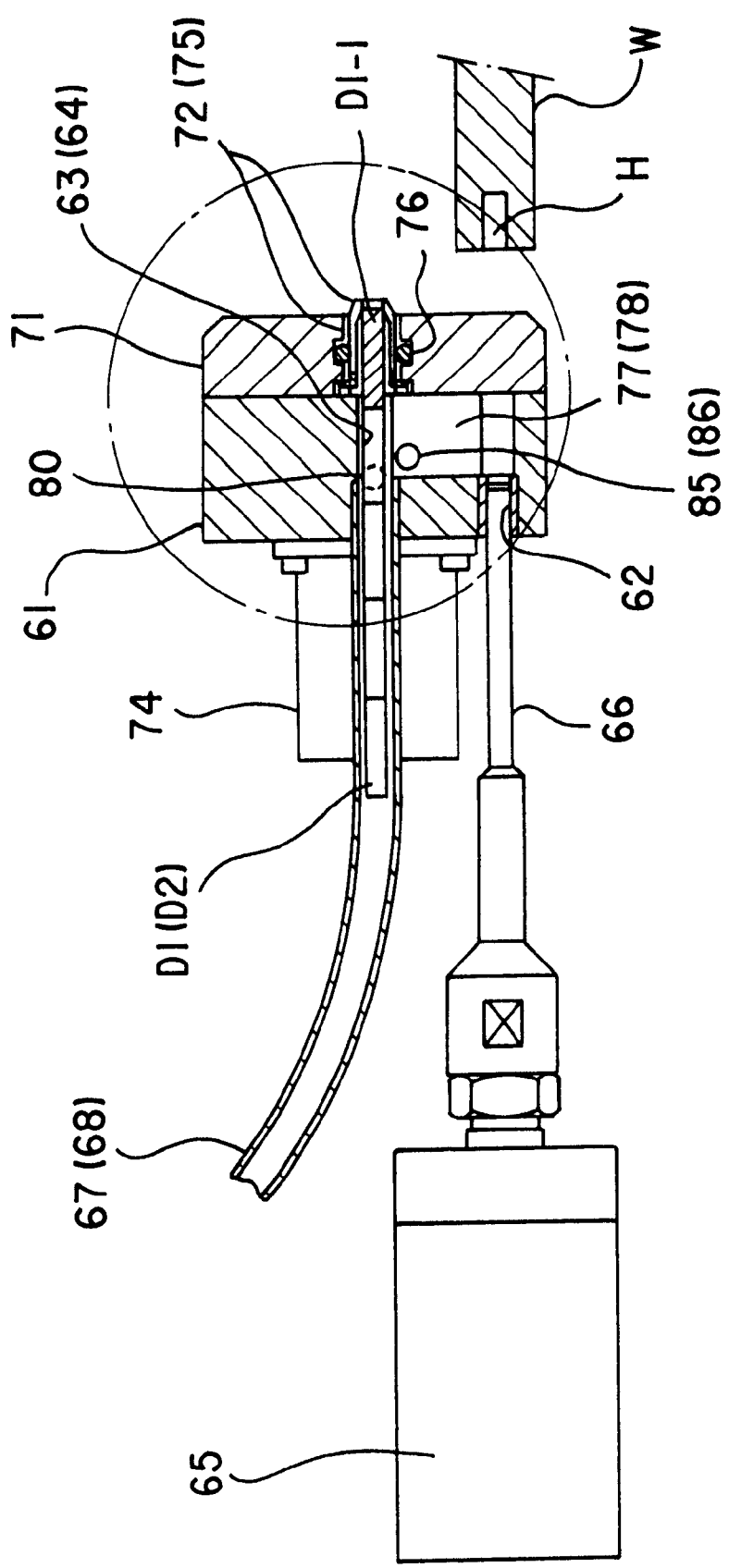
FIG. 5 is a cross-sectional side view in the state of an ejection pipe facing a receiving hole on the small diameter side.
Figure 6:
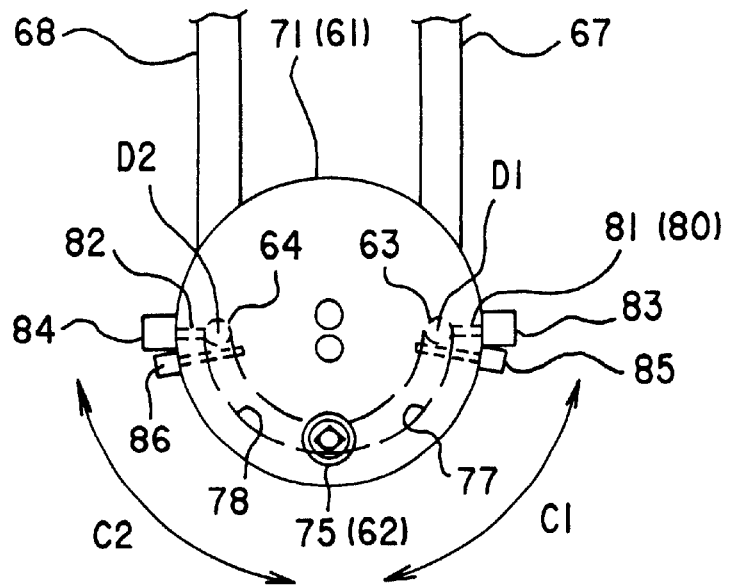
FIG. 6 is an explanatory front view of the head in the initial state.
Figure 7:
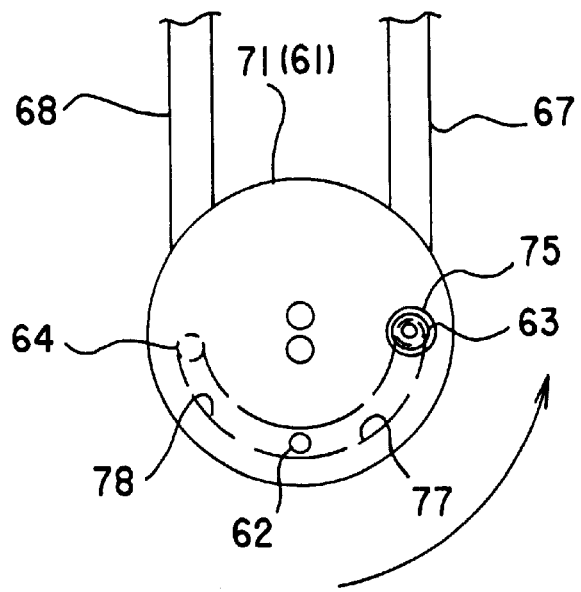
FIG. 7 is an explanatory front view corresponding to FIG. 5.

A shown in FIGS. 5 and 6, a first transfer passage 77 inter connecting the first receiving hole 63 and the shaft hole 62 and a second transfer passage 78 inter connecting the second receiving hole 64 and the shaft hole 62 are formed in the front part of the head 61. The first and second transfer passages 77 and 78 are made in an arcuate shape centered on the axis of the drive shaft 73, with the depth (about 20 mm in this example) of the first transfer passage 77 being slightly shallower than the length (about 25 mm in this example) of the dowel D1 to be fit in the first receiving hole 63. Likewise, the depth of the second transfer passage 78 is made slightly shallower than the length of the dowel D2 to be fit in the second receiving hole 64.

Figure 4:
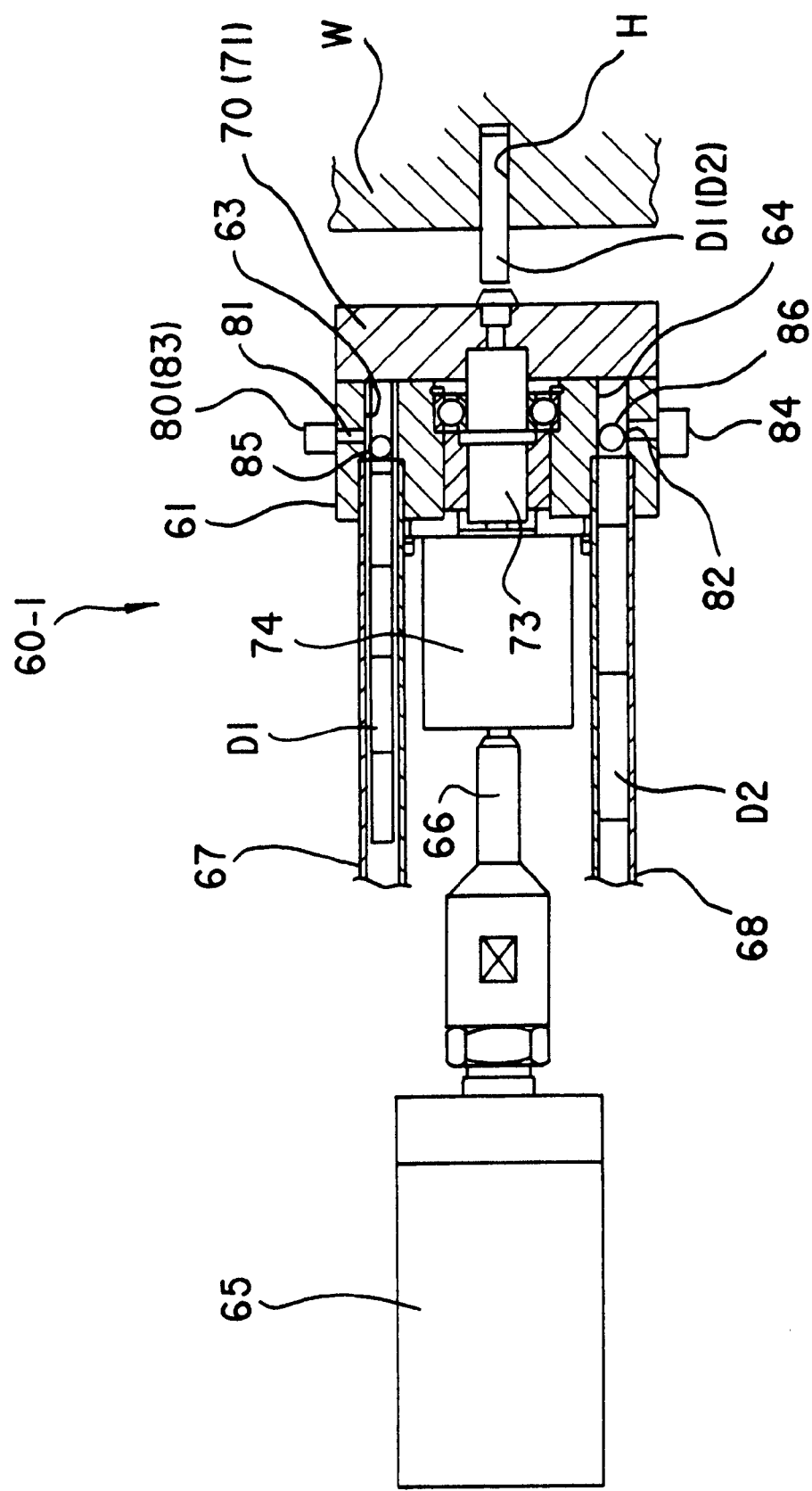
FIG. 4 is a cross-sectional plan view of a dowel driving head device as a first embodiment of the invention.

A stopper device 80 for holding and releasing passage of the dowels D1 and D2 in the first and second receiving holes 63 and 64 is attached to the head 61. The stopper device 80 is arranged that, as shown in FIGS. 4 and 6, first and second stopper pins 81 and 82 are fit to be radially movable in both right and left sides of the head 61 where the first and second receiving holes 63 and 64 are located, and moved with first and second cylinders 83 and 84. By pressing or releasing the dowels D1 and D2 in the first and second receiving holes 63 and 64 by the movement of the pins, passage of the dowels D1 and D2 in the first and second receiving holes 63 and 64 is stopped or released.

As shown in FIGS. 4 and 6, first and second detachable guides 85 and 86 are attached to project toward the inside, on the first and second receiving holes 63, 64 side, of the first and second transfer passages 77 and 78, on both right and left hand sides of the head 61. The first and second guides 85 and 86 are intended to prevent the dowels D1 and D2 from accidentally rolling in the first and second transfer passages 77 and 78 toward the shaft hole 62 when the dowels D1 and D2 are short-sized, for example 25 mm long, about the same length as the depth of the first and second transfer passages 77 and 78. In the case the dowels D1 and D2 are long-sized, for example 40 mm long, longer than the depth of the first and second transfer passages 77 and 78, the first and second guides 85 and 86 are removed. Of the first and second transfer passages 77 and 78, the first transfer passage 77 interconnecting the small diameter first receiving hole 63 and the shaft hole 62 is made with a narrow width nearly corresponding to the diameter of the first receiving hole 63, while the second transfer passage 78 interconnecting the large diameter second receiving hole 64 and the shaft hole 62 is made with a wide width nearly corresponding to the diameter of the second receiving hole 64.

Next, the manner of operation of the first embodiment will be described. First, the case 41 of the hole boring device 40 is vertically adjusted to set, for example, the small diameter drill 43 (or large diameter one 42) to the height of the shaft hole 62. When started in this state, the feed pulley 25 is rotated through the X-axis motor 24, the X-axis movement table 23 moves in the X-axis direction, namely along the rear surface of the surface plate 13, At the same time, the attachment table 31 is moved up and down by rotating the elevator screw 34 with the Y-axis motor 33 to set the drill 43 to the height position of the work W placed on the surface table 13. As a result, the drill 43 faces an intended position of the rear surface of the work W placed on the surface plate 13 through the attachment table 31. Next, as the drill 43 is rotated with the drill motor 44 and moved back and forth with the cylinder, a dowel hole H of an intended diameter is bored in the work W.

Next, as the X-axis motor 24 is rotated, the hole boring device 40 (drill 43) is moved through the X-axis movement table 23 and the attachment table 31 to a hole boring position of the next step, and the paste spouting device 50 and the dowel driving head device 60-1 face the dowel hole H already bored with the hole boring device 40. That is to say, the paste nozzle 55 of the paste spouting device 50 located rear below faces the inlet of the dowel hole H, while the shaft hole 62 of the dowel driving head device 60-1 located behind the dowel hole H coaxially faces the inlet of the dowel hole H. Next, paste is spouted from the paste spouting nozzle 55 to supply a specified amount of paste into the dowel hole H and then the dowel driving head device 60 ejects the small diameter dowel D1 (or large diameter dowel D2) from the shaft hole 62 and drives it into the dowel hole H.

Here, in the case the viscosity of paste for the paste spouting device 50 is set to a higher value at the time of spouting, the cylinder 51 is extended to bring the tip of the paste spouting nozzle 55 close to the inlet of the dowel hole H, paste is spouted, and the cylinder 51 is retracted. On the contrary, in the case the viscosity is set to a lower value, paste is spouted with the cylinder remaining in the retracted state, namely with the tip of the paste spouting nozzle 55 located away from the inlet of the dowel hole H.

The dowels D1 and D2 are driven with the dowel driving head device 60 in the following manner. When the dowels D1 and D2 used are of about the same length as the depth of the first and second transfer passages 77 and 78, for example 25 mm, the driving work is performed with the first and second guides 85 and 86 attached. When the length of the dowels D1 and D2 is longer than the depth of the first and second transfer passages 77 and 78, namely when 40 mm long dowels are used, the first and second guides 85 and 86 are removed in advance.

In the above-described state, a case will be described in which dowels D1 ad D2 of different diameters of 6 mm and 8 mm and the same length of 25 mm are set in position, and the small diameter dowel D1 is driven. First, as shown in FIG. 6, the first and second stopper pins 81 and 82 are projected by the operation of the first and second cylinders 83 and 84 to hold both of the dowels D1 and D2 in the first and second receiving holes 63 and 64. As the rotary disk 71 is rotated with the feed motor 74 to the neutral position, the ejection pipe 75 faces the shaft hole 62. When the small diameter dowel D1 is chosen in that state, the first stopper pin 81 is retracted to permit the small diameter dowel D1 to pass through the first receiving hole 63.

Figure 8:
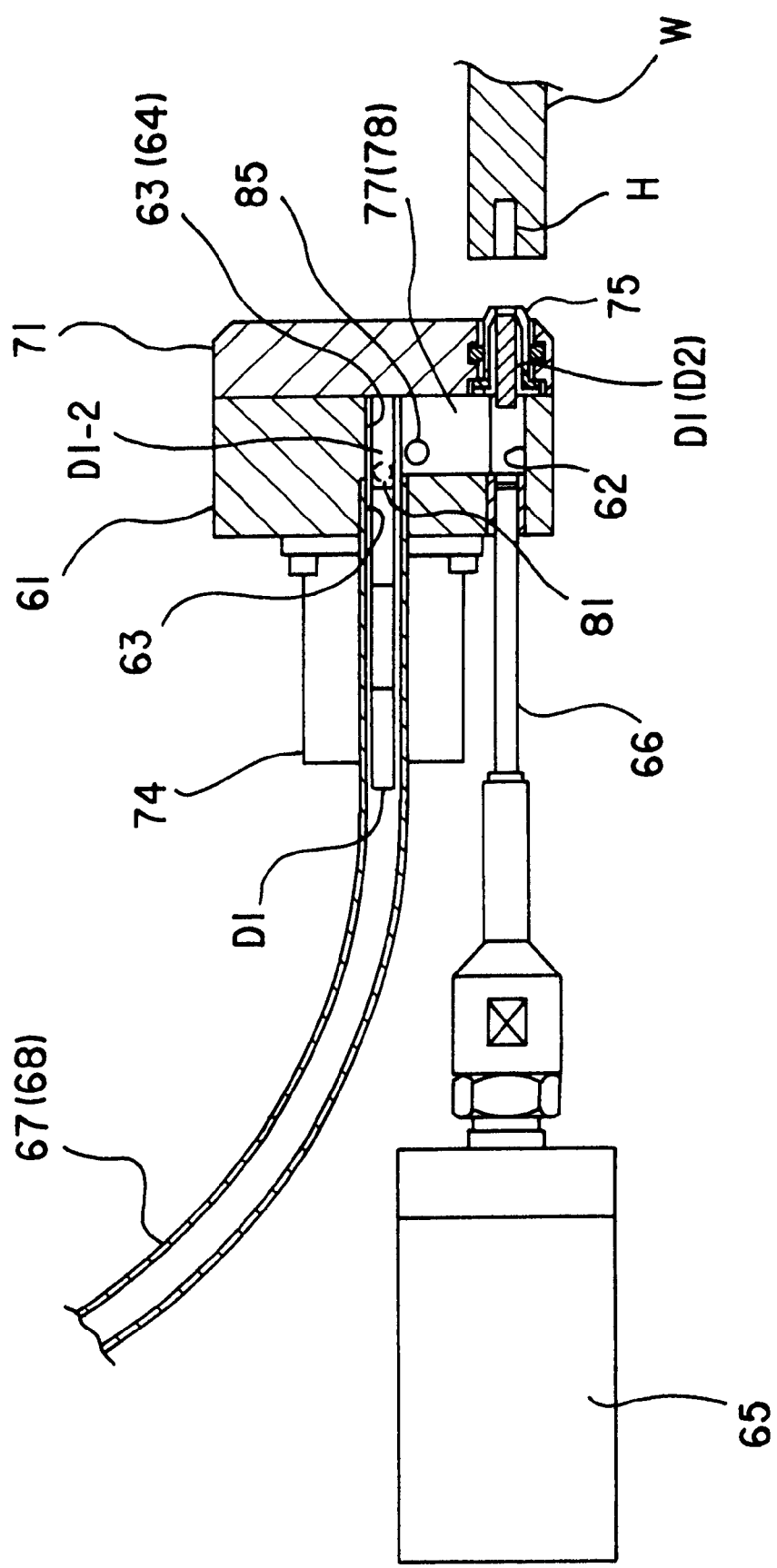
FIG. 8 is a cross-sectional side view in the state of an ejection pipe facing a shaft hole.

As the rotary disk 71 is rotated back and forth in the arrow directions C1 in FIG. 6 by 90 degrees, its ejection pipe 75 faces the second receiving hole 64 and the shaft hole 62 by turns to make the small diameter dowel D1 face the shaft hole 62. That is, as the rotary disk 71 rotates from the state of FIG. 6 (neutral position) counterclockwise by 90 degrees and its ejection pipe 75 faces the first receiving hole 63, as shown in FIG. 5, the small diameter dowel D1-1 in the forefront is ejected (supplied) to the ejection pipe 75. Since the ejection pipe 75 has a front end part inside diameter which is slightly smaller than the outside diameter of the small diameter dowel D1, the small diameter dowel D1 in the forefront is held in the fit-in state. Next, when the rotary disk 71 rotates clockwise in FIG. 7 by 90 degrees, as shown in FIG. 8, its ejection pipe 75 causes the small diameter dowel D1-1 in the forefront to move and face the shaft hole 62.

Figure 9:
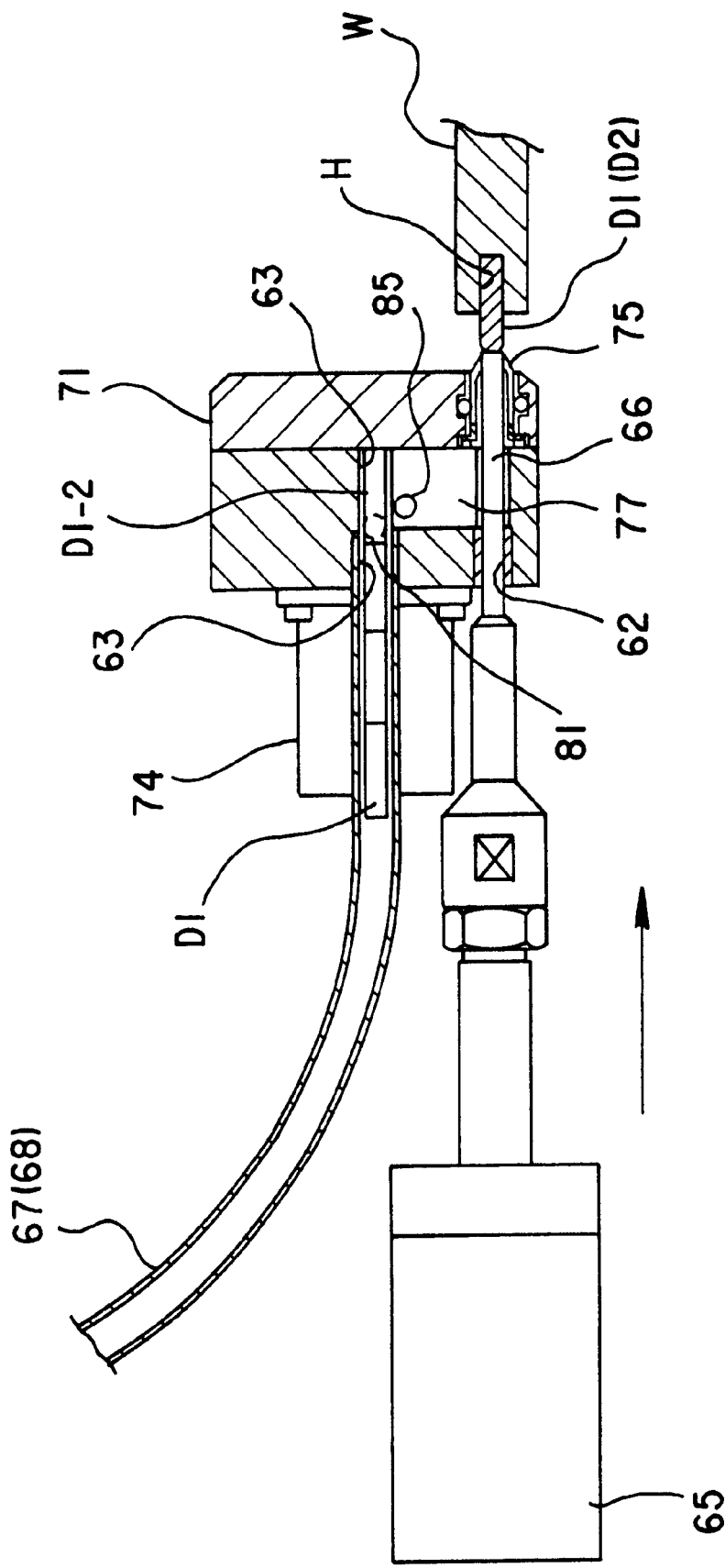
FIG. 9 is a cross-sectional side view in the state of driving a small diameter dowel into a dowel hole.

Here, a large diameter dowel D1-2, for the next step, appearing in the first transfer passage 77 remains there with its side surface contacting the first guide 85, and is restricted from rolling toward the shaft hole 62. Next, as shown in FIG. 9, the ejection cylinder 65 is operated to advance the shaft 66, the dowel D1-1 moves to the right while expanding the diameter of the front end part of the ejection pipe 75, and the dowel is driven into the dowel hole H in the work W located in front. When the driving is over, the cylinder 65 retracts to retract the shaft 66, the attachment table 31 moves in the X-axis direction, and the shaft 66 faces the next dowel hole H. The above steps are repeated thereafter to drive the dowels D1 in succession into the dowel holes H.

In order to drive the large diameter dowel D2, the second stopper pin 82, rather than the first stopper pin 81, is retracted to permit the large diameter dowel D2 to pass through the second receiving hole 64. As the rotary disk 71 is rotated back and forth in the arrow directions C2 in FIG. 6 by 90 degrees, its ejection pipe 75 faces the second receiving hole 64 and the shaft hole 62 by turns to make the large diameter dowel D2, on the second receiving hole 64 side, face the shaft hole 62. The shaft 66 is operated to drive the large diameter dowel D2 into the intended dowel hole H. When the length of the dowels D1 and D2 is greater than the depth of the first and second transfer passages 77 and 78, namely for example when dowels of different diameters of 6 mm and 8 mm and of the same length of 40 mm are driven, the first and second guides 85 and 86 are removed because, if they are present, they collide with the dowel when it is sent toward the shaft hole 62. In that case, the rear end part of the long-sized dowel D1 (or D2) moves along the first transfer passage 77 (or the second transfer passage 78) formed in the head 61.

This invention can be applied also to dowels of the same diameter and different lengths. In the case dowels of a single kind are driven, an arrangement may be made in which the rotary disk 71 is provided with a plurality of through holes 72 equally spaced along the circumferential direction, and the disk is rotated intermittently in one direction. In that way, the action of holding one dowel in the receiving hole 63 (or 64) may be performed simultaneously with the action of causing another dowel held to face the shaft hole 62, so that the dowel driving work is performed quickly.

Figure 10:
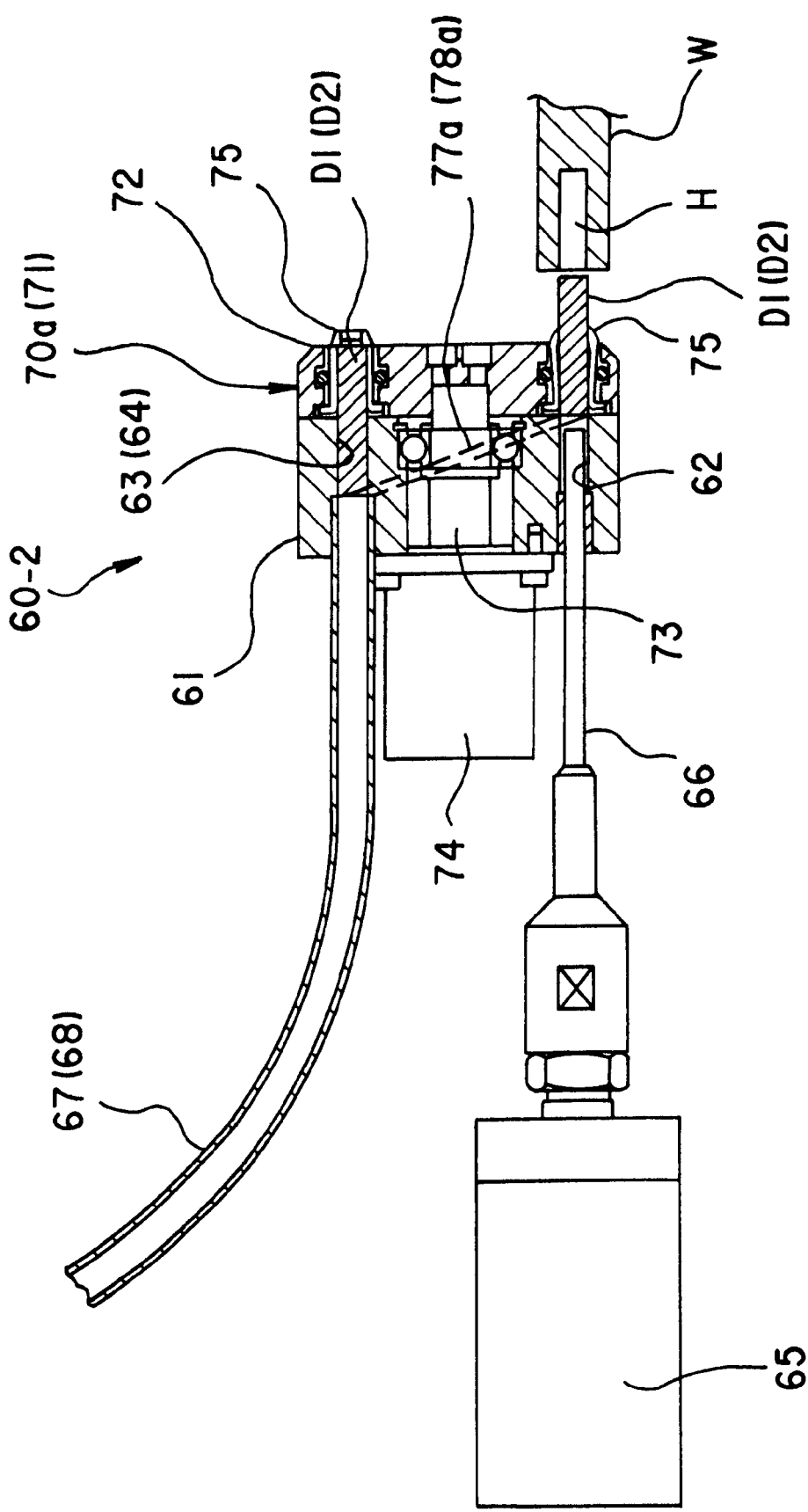
FIG. 10 is a cross-sectional plan view of a dowel driving head device as a second embodiment of the invention.
Figure 11:
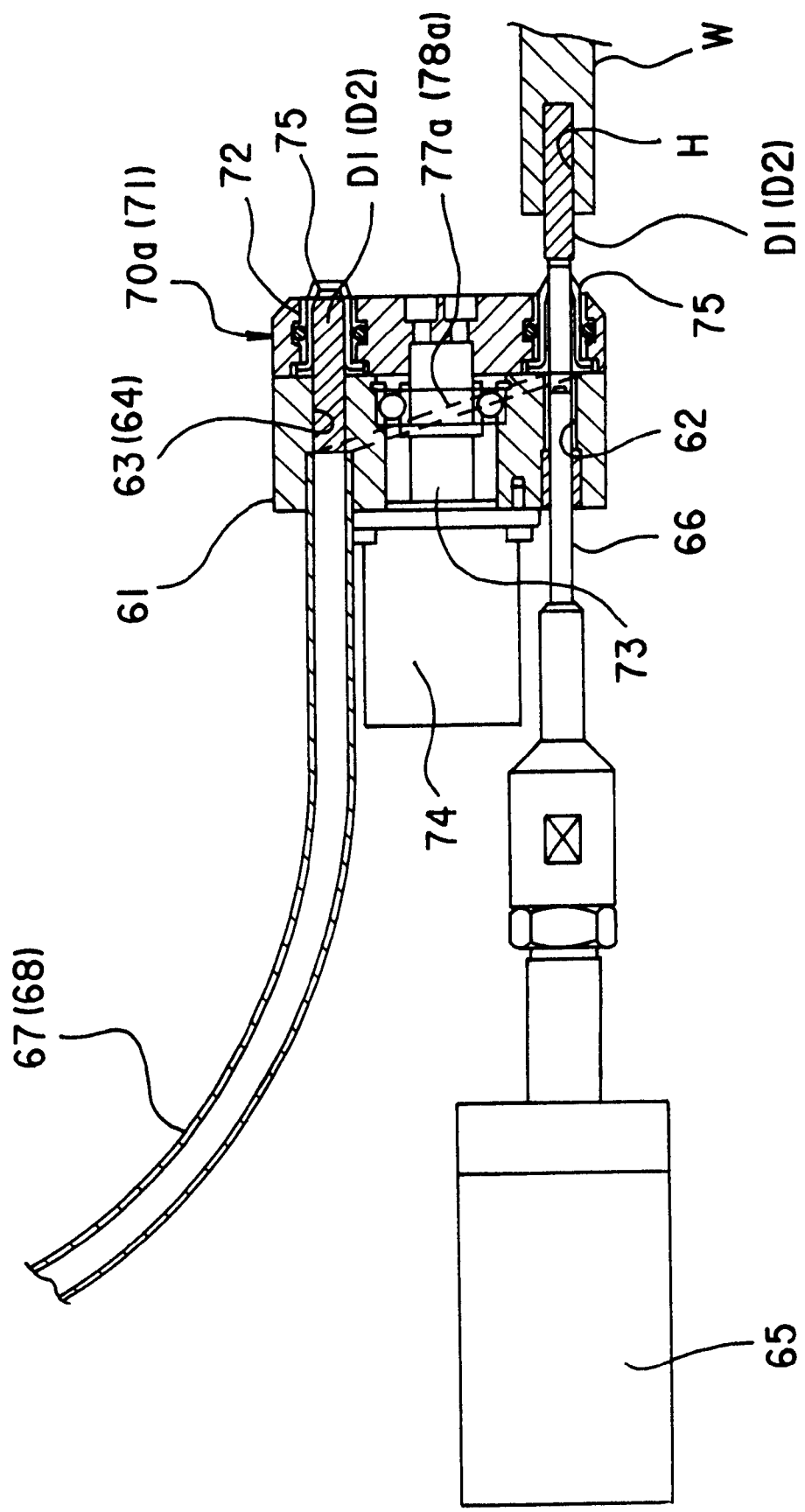
FIG. 11 is a cross-sectional side view in the state of driving a dowel according to the second embodiment.

In FIGS. 10 and 11, a dowel driving head device 60-2 of the second embodiment comprises a head 61, like that of the first embodiment, having the shaft hole 62 and the first and second receiving holes 63 and 64. The shaft 66 reciprocated back and forth with the cylinder 65 is fit in the shaft hole 62. The first and second chutes 67 and 68, like those described before, are respectively fit in the first and second receiving holes 63 and 64.

A selective feed device 70a is attached to the head 61. The selective feed device 70a comprises like that of the first embodiment; the rotary disk 71, the through hole 72, the drive shaft 73, the feed motor 74, and the ejection pipe 75. The first and second transfer passages 77a and 78a connecting the first and second receiving holes 63 and 64 to the shaft hole 62 are formed in the front part of the head 61. The bottom surfaces of the first and second transfer passages 77a and 78a are made as cam surfaces displaced in the axial direction, with the bottom surfaces being deeper on the first and second receiving holes 63, 64 sides and becoming shallower toward the shaft hole 62.

According to the second embodiment, as shown in FIG. 10, as the rotary disk 71 is rotated with the feed motor 74 to a position in which the through hole 72 (ejection pipe 75) faces one of the receiving holes, for example the first receiving hole 63, a small diameter dowel D1 from the first receiving hole 63 fits into the ejection pipe 75. In that state, as the rotary disk 71 is rotated with the feed motor 74 and the ejection pipe 75 is moved toward the shaft hole 62, the dowel D1 being fit in the ejection pipe 75 is gradually moved forward with the bottom surface of the first transfer passage 77a and, as shown in the lower area in FIG. 10, the rear end of the dowel D1 is positioned at the front end of the shaft hole 62. In that state, when the cylinder 65 extends to forward the shaft 66, the dowel D1 (or D2) in the ejection pipe 75 is pushed into the dowel hole H of the work W located in front (FIG. 11).

According to the second embodiment, since the rear end of the dowel D1 (or D2) reaching the shaft hole 62 is always brought to the same position, or the front end of the shaft hole 62, the amount of reciprocating movement of the shaft 66 is minimized, so that the dowel D1 (or D2) can be driven quickly and reliably. Incidentally, the first and second transfer passages 77 and 78 may be formed in different depths to supply the dowels D1 (or D2) of different lengths.

FIGS. 12 to 17 show a dowel driving head device as the third embodiment. In FIGS. 12 to 17, the dowel driving device 60-3 of the third embodiment has its head 100. The head 100 is made in a block shape and attached to the attachment table 31. The head 100 is provided with a shaft hole 101 in its right-left center, and with two receiving holes of different diameters, for example the first receiving hole 102 of 6 mm in diameter and the second receiving hole 103 of 8 mm in diameter, on its right and left sides, respectively bored through in the front-rear direction (normal to FIG. 13). A shaft 106 moved in the front-rear directions with an ejection cylinder 105 is fit in the shaft hole 101. The lower end of the first chute 107 for arranging the 6 mm diameter dowels D1 in series and causing them to flow down is fit in the first receiving hole 102. The lower end of the second chute 108 for arranging the 8 mm diameter dowels D2 in series and causing them to flow down is fit in the second receiving hole 103.

A selective feed device 110 is attached to the head 100. That is, a lateral feed plate (slider) 111 moved right and left with a feed cylinder 114 (FIG. 14) is attached to the head 100, and cylindrical, first and second ejection pipes 112 and 113 are fit in right and left through holes (without symbols provided) bored through the lateral feed plate 111. The first and second ejection pipes 112 and 113 are disposed with a mutual distance corresponding to the distance between the first and second receiving holes 102 and 103, with their rear parts (base parts) fit and secured in the through holes in the lateral feed plate 111. with their front parts projecting forward, with the inside diameter of their front ends made slightly smaller than the diameter of the smaller diameter dowel D1, and with their front part peripheral wall projecting from the lateral feed plate 111 and divided with slits in the circumferential direction. The cylinder 114 laterally moves the lateral feed plate 111 so that the first and second ejection pipe 112 and 113 face the shaft hole 201 and the first and second receiving holes 102 and 103 by turns.

Figure 12:
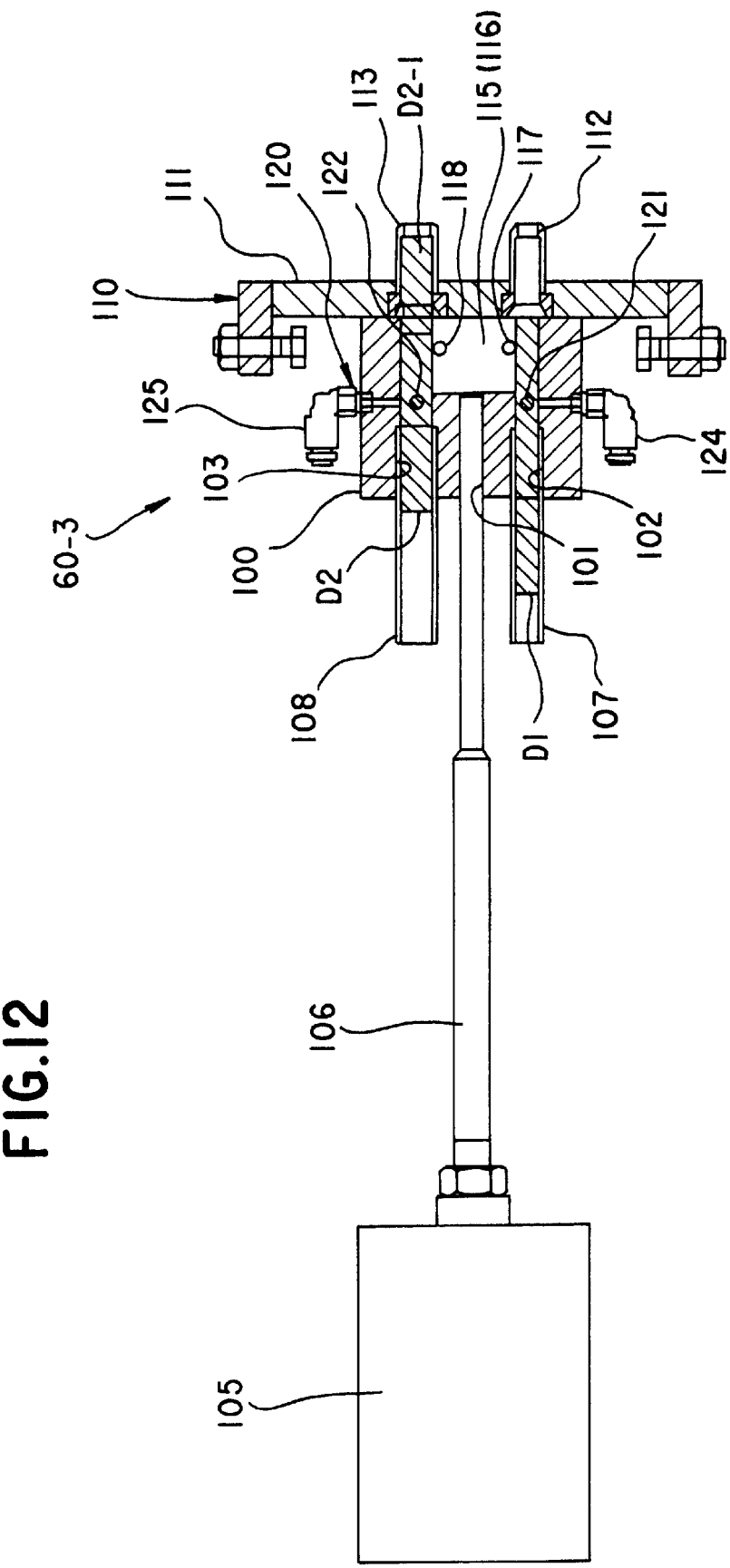
FIG. 12 is a cross-sectional plan view of a dowel driving head device as a third embodiment of the invention.
Figure 13:
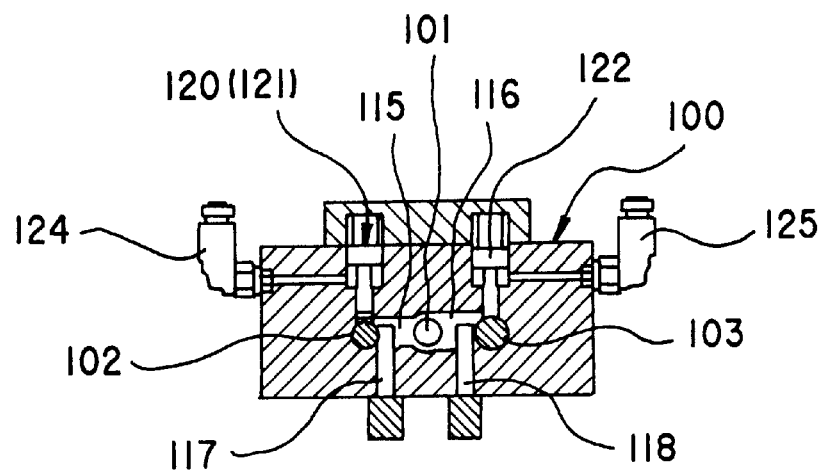
FIG. 13 is an explanatory front view corresponding to FIG. 12.
Figure 14:
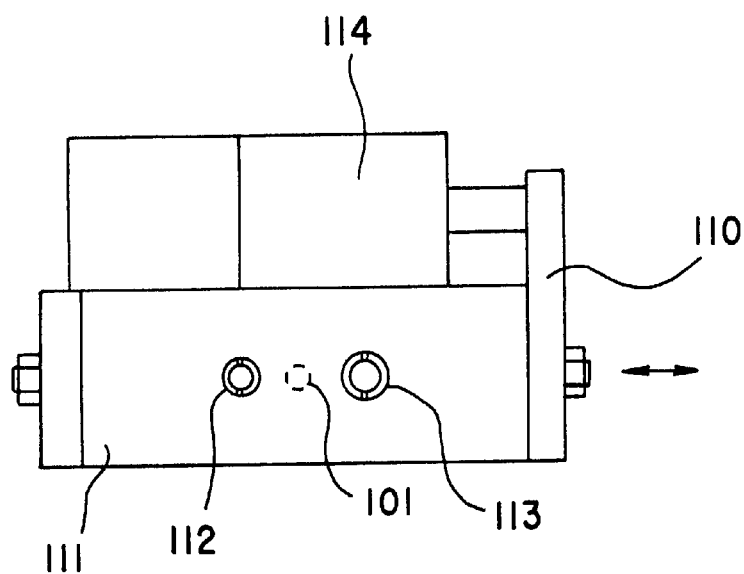
FIG. 14 is a front view of FIG. 12.

As shown in FIGS. 12 and 13, the first transfer passage 115 interconnecting the first receiving hole 102 and the shaft hole 101, and the second transfer passage 116 interconnecting the second receiving hole 103 and the shaft hole 101 are formed in the front part of the head 100. The depth of the first and second transfer passages 115 and 116 is made, for example about 20 mm, slightly smaller than the length, for example 25 mm, of the shorter type of dowel. The first and second guides 117 and 118 projecting toward the inside on the first and second receiving holes 102, 103 sides of the first and second transfer passages 115 and 116 are detachably attached to the lower right and left parts of the head 100.

A stopper device 120 for holding and releasing passage of the dowels D1 and D2 in the first and second receiving holes 102 and 103 is attached to the head 100. The stopper device 120 is constituted as shown in FIG. 13: First and second stopper pins 121 and 122 with pistons urged with coil springs to project into the first and second receiving holes 102 and 103 are attached to the upper part of the head 100.

First and second air supply hoses 124 and 125 for supplying compressed air to the lower parts of the cylinder chambers in which the pistons of the first and second stopper pins 121 and 122 fit are attached to both sides of the head 100. As the air supply passages of the air supply hoses 124 and 125 are opened and closed with solenoid valves (not shown). the first and second stopper pins 121 and 122 are moved up and down, and the passage of the dowels D1 and D2 in the first and second receiving holes 102 and 103 is held and released.

The first and second guides 117 and 118, like those of the first embodiment, are intended to prevent the dowels D1 and D2 from accidentally rolling in the first and second transfer passages 115 and 116 toward the shaft hole 101 when the dowels D1 and D2 are short-sized, for example 25 mm long. In the case the dowels D1 and D2 are long-sized, for example 40 mm long, longer than the depth of the first and second transfer passages 115 and 116, the first and second guides 117 and 118 are removed. Of the first and second transfer passages 115 and 116, the first transfer passage 115 interconnecting the small diameter first receiving hole 102 and the shaft hole 101 is made with a narrow width nearly corresponding to the diameter of the first receiving hole 102, while the second transfer passage 116 interconnecting the large diameter second receiving hole 103 and the shaft hole 101 is made with a wide width approximately corresponding to the diameter of the second receiving hole 103.

The dowel driving head device 60-3 of the third embodiment is operated as described below. A case will be described in which dowels D1 ad D2 of different diameters of 6 mm and 8 mm and the same length of 25 mm are set in position, and the large diameter dowel D2 is driven. In the initial period, the first and second stopper pins 121 and 122 are operated to project and hold both of the dowels D1 and D2 in the first and second receiving holes 102 and 103. When the large diameter dowel D2 is chosen in that state, the second stopper pin 122 is retracted and the second ejection pipe 113 faces the second receiving hole 103. As a result, as shown in FIG. 12, a large diameter dowel D2-1 in the forefront moves from the second receiving hole 64 through the second transfer passage 116, and fits in the second ejection pipe 113.

Figure 15:
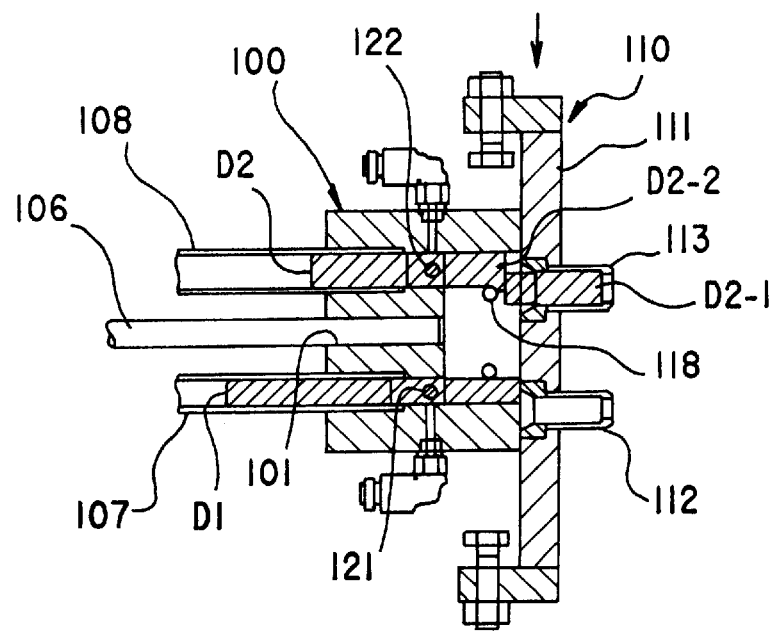
FIG. 15 is a cross-sectional plan view showing the initial state of dowel movement.
Figure 16:
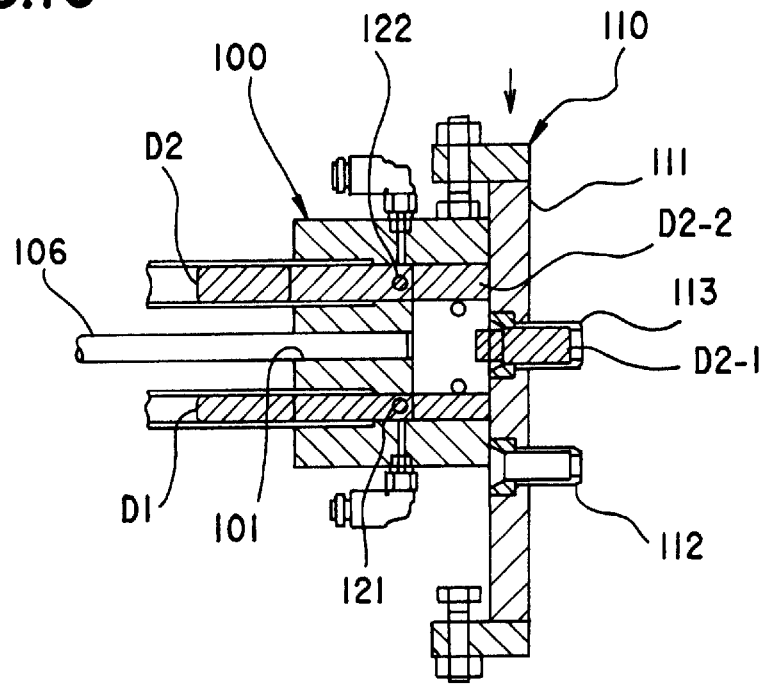
FIG. 16 is a cross-sectional plan view in the state of a dowel facing a shaft hole.

Next, as the second stopper pin 122 is operated to project and a large diameter dowel D2-2 for the next step is held in the second receiving hole 103, the second ejection pipe 113 is moved toward the shaft hole 101 as shown in FIGS. 15 and 16, and the large diameter dowel D2-1 in the forefront is moved to a position facing the shaft hole 101. Here, the large diameter dowel D2-2 for the next step, with its side surface contacting the first guide 85, is restricted from rolling toward the shaft hole 101. When the large diameter dowel D2-1 in the forefront is moved to the position of the shaft hole 101, as shown in FIG. 16, the second stopper pin 122 retracts, and the large diameter dowel D2-2 for the next step moves forward until it strikes against the lateral feed plate 111.

Figure 17:
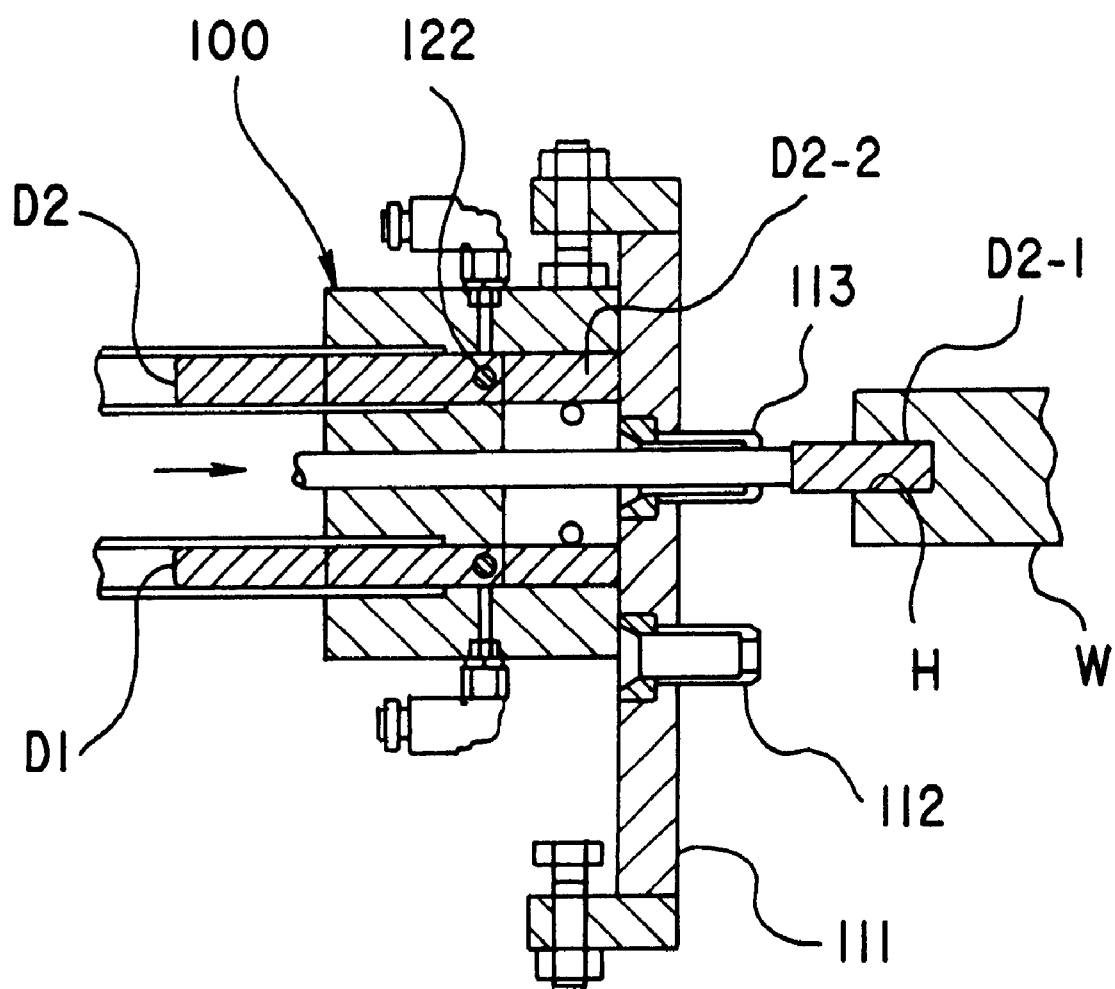
FIG. 17 is a cross-sectional plan view in the state of driving a dowel.

In this state, as shown in FIG. 17, after the ejection cylinder 105 is operated to move forward the shaft 106 and to strike the large diameter dowel D2-1 in the forefront into the intended dowel hole H in the work W, the shaft 106 retracts, the lateral feed plate 111 returns to the initial (neutral) position, and the first and second ejection pipes 112 and 113 face the first and second receiving holes 102 and 103.

In the case the small diameter dowel D1 is driven, the lateral feed plate 111 is operated so that the first stopper pin 121 rather than the second stopper pin 122 performs similar operation to the above, and the first ejection pipe 112 rather than the second ejection pipe 113 performs similar operation to the above. In the case the dowels D1 and D2 are long-sized, for example 40 mm long, longer than the depth of the first and second transfer passages 115 and 116, and their diameters are different, 6 mm and 8 mm, the first and second guides 117 and 118 are removed in advance.

FIGS. 18 to 28 show a dowel driving head device or the fourth embodiment. In FIGS. 18 to 28, the dowel driving device 60-4 of the fourth embodiment has its head 200. The head 200 is made in a block shape and attached to the attachment table 31. The head 100 is provided with a shaft hole 201 in its right-left center, and with two receiving holes of different diameters, for example the first receiving hole 202 of 6 mm in diameter and the second receiving hole 203 of 8 mm in diameter, on its lower right and left sides, respectively bored through in the front-rear direction (right-left direction in FIG. 18). A shaft 206 moved in the front-rear directions with an ejection cylinder 205 is fit in the shaft hole 201. The lower end of the first chute 207 for arranging the 6 mm diameter dowels D1 in series and causing them to flow down is fit in the first receiving hole 202. The lower end of the second chute 208 for arranging the 8 mm diameter dowels D2 in series and causing them to flow down is fit in the second receiving hole 203.

Figure 18:
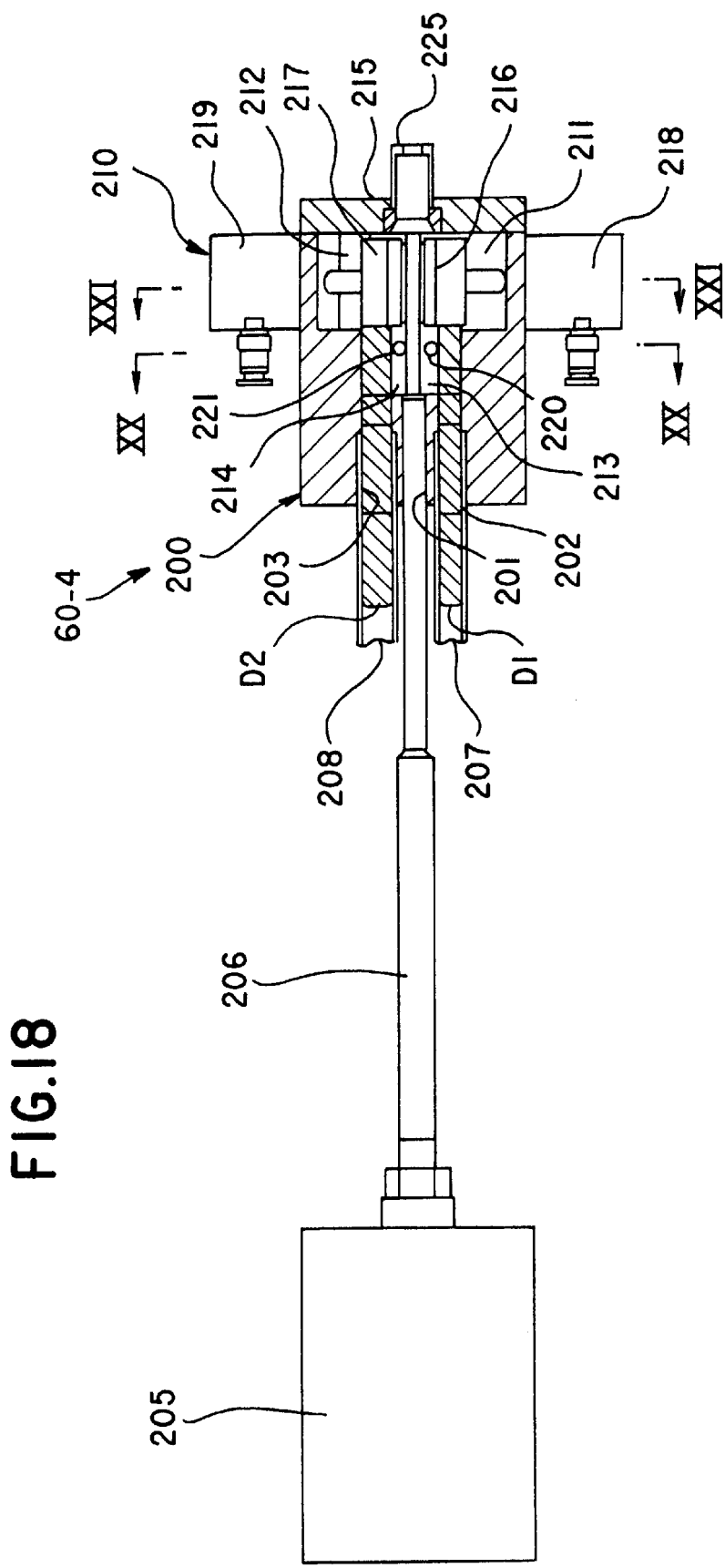
FIG. 18 is a cross-sectional plan view of a dowel driving head device as a fourth embodiment of the invention.
Figure 19:
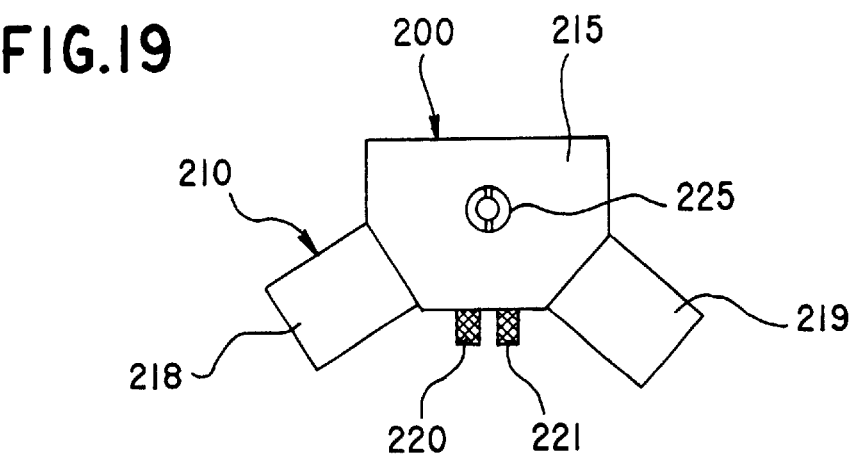
FIG. 19 is a front view of FIG. 18.

A selective feed device 210 for choosing the dowels D1 and D2 supplied from the first and second receiving holes 202 and 203 is attached to the front part of the head 200. That is, in the front part of the head 200 are formed continuously the first and second transfer passages 211 and 212, and the first and second auxiliary transfer passages 213 and 214 to interconnect the front part of the shaft hole 201 and the front parts of the first and second receiving holes 202 and 203, with the front faces of the first and second transfer passages 211 and 212 are closed as shown in FIG. 18 with a front plate 215 attached to the front part of the head 200.

The depth (the length in right-left direction in FIG. 18) of the first and second transfer passages 211 and 212 is made to correspond to the length of the short-sized dowels D1 and D2, for example 25 mm. The depth of the first and second auxiliary transfer passages 213 and 214 is made slightly smaller than that, about 20 mm. A pair of first and second push members (slide plates) 216 and 217 are slidably fit in the first and second transfer passages 211 and 212 in the direction intersecting the axis of the shaft hole 201. The first and second push members 216 and 217 are individually reciprocated in approaching and departing directions (up-down directions) with the first and second cylinders 218 and 219 attached to both sides in the front part of the head 200. The most approached positions of the first and second push members 216 and 217 are spaced as shown in FIG. 20 so that the push members contact both of the undersides of the dowel D1 (or D2) facing the shaft hole 201.

The first and second guides 220 and 221 projecting toward the inside of the first and second receiving holes 202 and 203 of the first and second auxiliary transfer passages 213 and 214 are detachably attached to right and left lower parts of the head 200. The first and second guides 220 and 221, like those of the first embodiment, are intended to prevent the dowels D1 and D2 from accidentally rolling in the first and second transfer passages 213 and 214 toward the shaft hole 201 when the dowels D1 and D2 are short-sized. In the case the dowel D1 (or D2) is long-sized, for example 40 mm long, longer than the depth of the first and second transfer passages 211 and 212, the first and second guides 220 and 221 are removed, and the rear part of the long-sized dowel D1 (or D2) is moved along the inside of the first and second auxiliary passages 213 and 214 toward the shaft hole 201.

Figure 20:
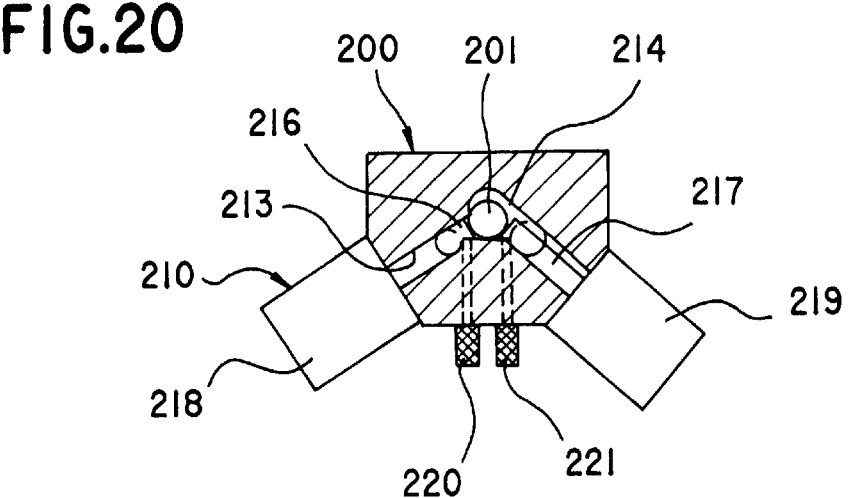
FIG. 20 shows a cross section XX—XX in FIG. 18.
Figure 21:
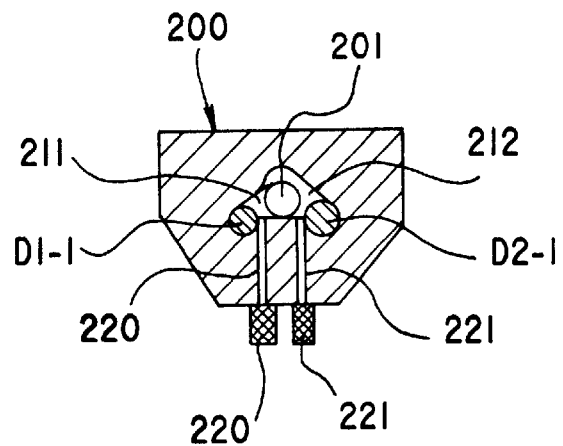
FIG. 21 shows a cross section XXI—XXI in FIG. 18.
Figure 22:
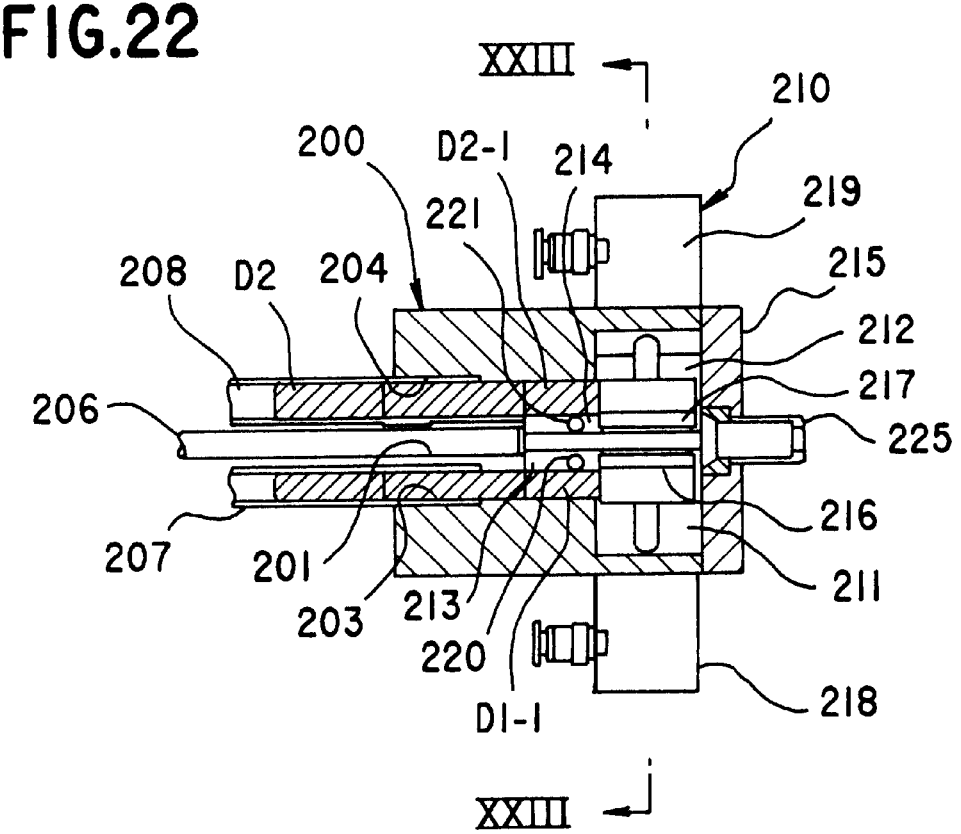
FIG. 22 is a cross-sectional plan view showing an initial state of a dowel driving head device.
Figure 23:
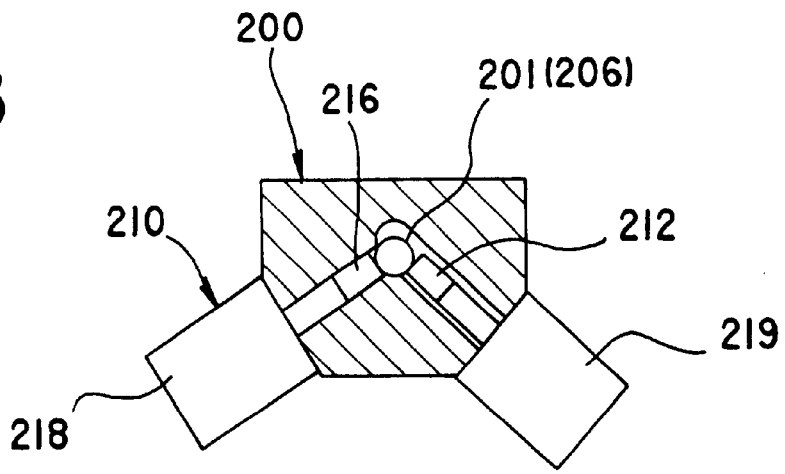
FIG. 23 shows a cross section XXIII—XXIII in FIG. 22.
Figure 24:
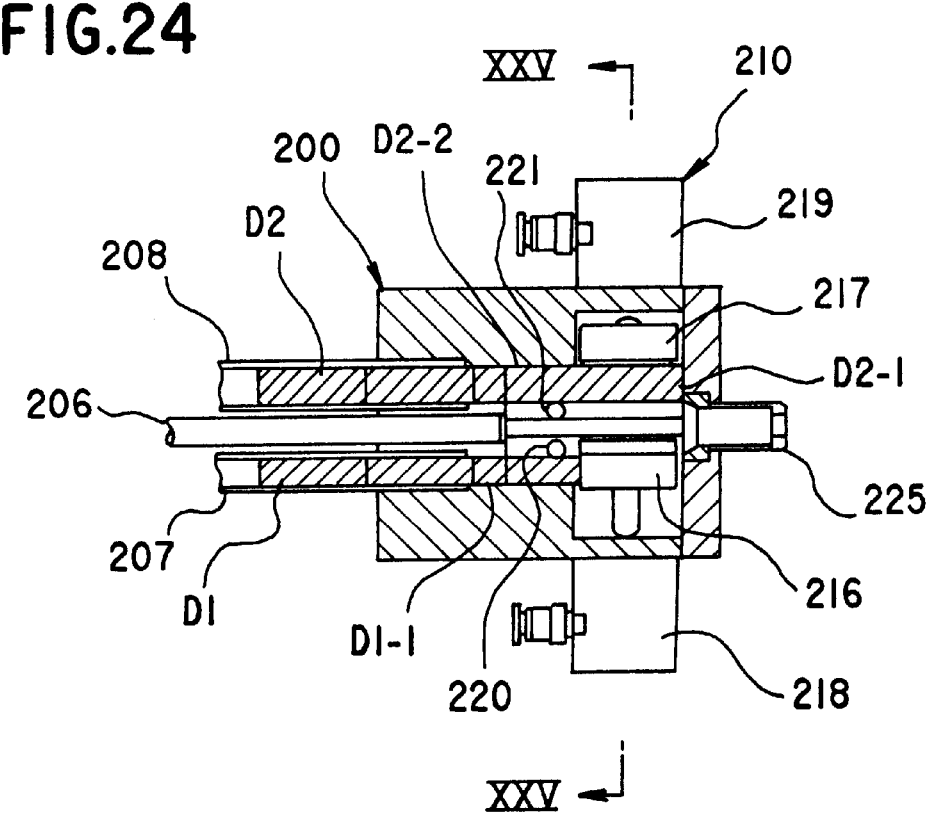
FIG. 24 is a cross-sectional plan view showing a dowel in moving state.
Figure 25:
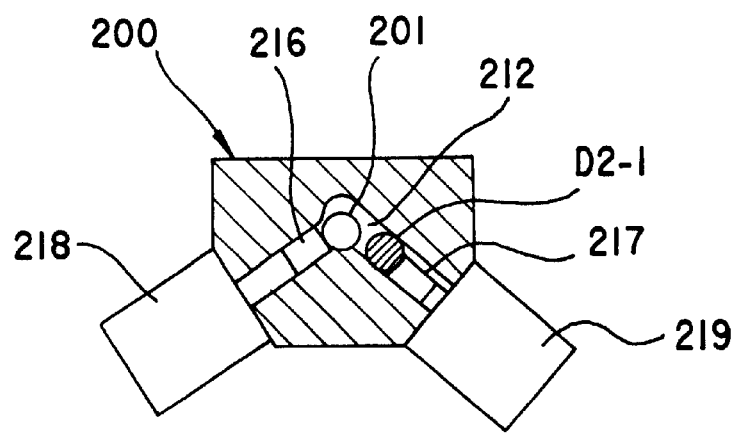
FIG. 25 shows a cross section XXV—XXV in FIG. 24.
Figure 26:
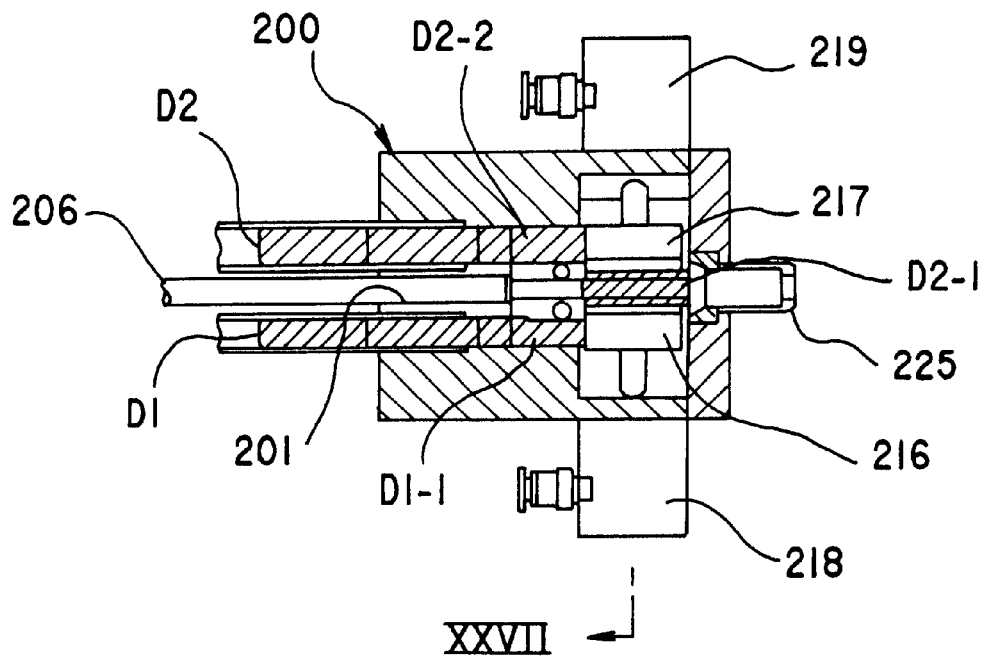
FIG. 26 is a cross-sectional plan view in the state of a dowel facing a shaft hole.
Figure 27:
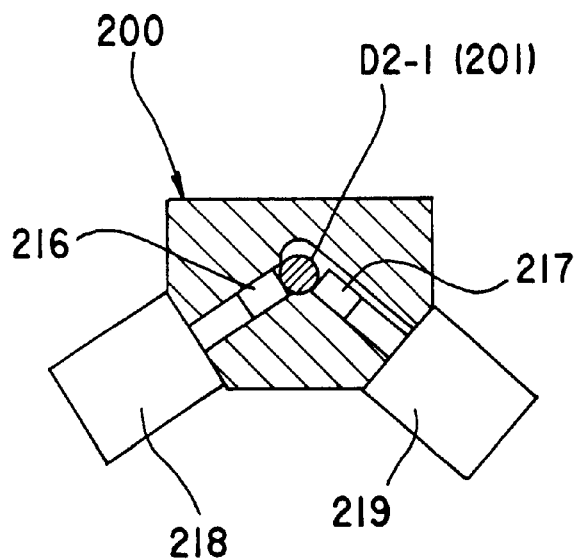
FIG. 27 shows a cross section XXVII—XXVII in FIG. 26.
Figure 28:
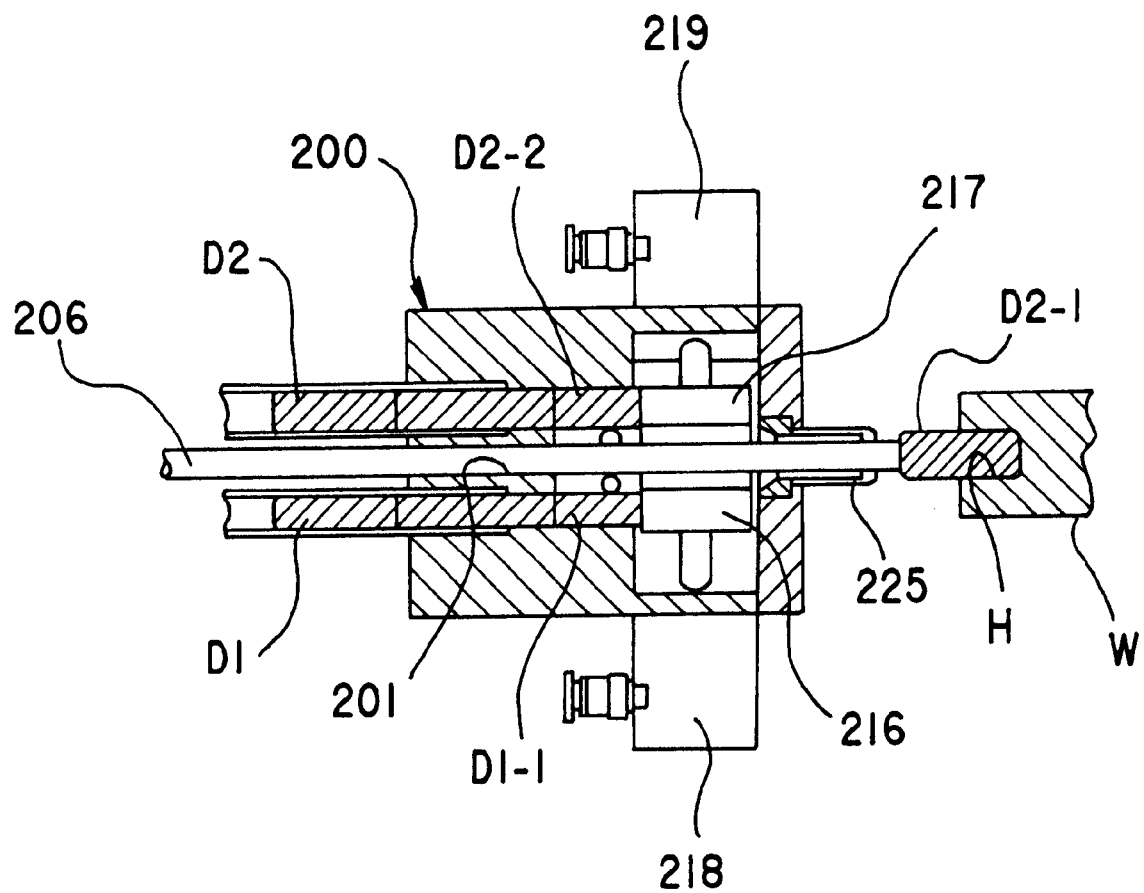
FIG. 28 is a cross-sectional plan view in the state of driving a dowel.

The widths of the first and second auxiliary passages 213 and 214, and the first and second transfer passages 211 and 212 are made as shown in FIGS. 20 and 21, to be narrow on the side where the small diameter first receiving hole 202 is connected to the shaft hole 201 nearly corresponding to the diameter of the first receiving hole 202, and to be wide on the side where the large diameter second receiving hole 203 is connected to the shaft hole 201 nearly corresponding to the diameter of the second receiving hole 203.

A cylindrical ejection pipe 225 is attached to a position, on the front plate 215, facing the shaft hole 201. The rear part (base part) of the ejection pipe 225 passes through and is secured to the front plate 215. while its front part projects forward. The ejection pipe 225 is made like that of the first embodiment with the inside diameter of the front end part slightly smaller than that of the small diameter dowel D1, and with the front part peripheral wall projecting from the front plate 215 divided in the circumferential direction with slits. This makes it possible that, even if the diameters of the dowels coming to the ejection position are different, the dowels D1 (or D2) are aligned on the axis of the shaft hole 201 (dowel hole H) and smoothly passed when they are pushed with the shaft 71.

FIGS. 29 to 36 show a dowel driving head device or the fifth embodiment. In FIGS. 29 to 36, the dowel driving device 60-5 of the fifth embodiment has its head 300. The head 300 is made in a block shape and attached to the attachment table 31. The head 300 is provided with a shaft hole 301 bored through in the front-rear direction, with a shaft 302 moved back and forth by means of an ejection cylinder being fit in the shaft hole 301. A selective feed device 305 for choosing and supplying different diameters of dowels D1 and D2 is disposed in the front-rear middle of the shaft hole 301.

Figure 29:
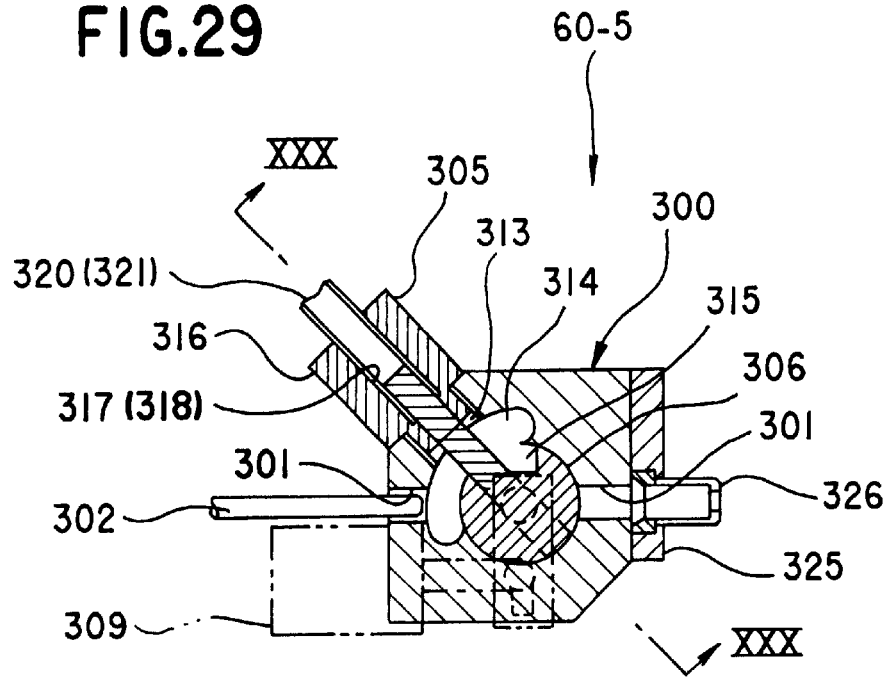
FIG. 29 is a cross-sectional side view of a dowel driving head device as a fifth embodiment of the invention in an initial state.
Figure 30:
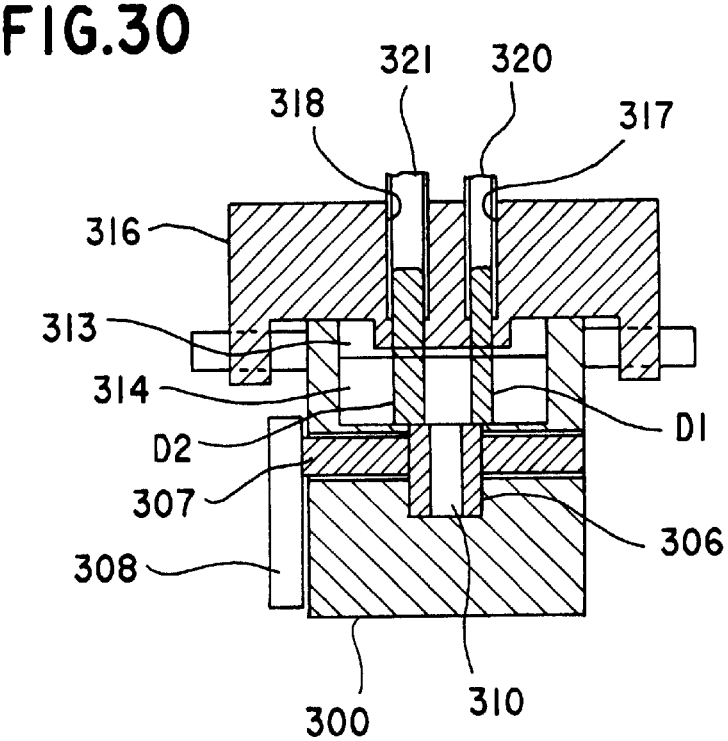
FIG. 30 shows a cross section XXX—XXX in FIG. 29
Figure 33:
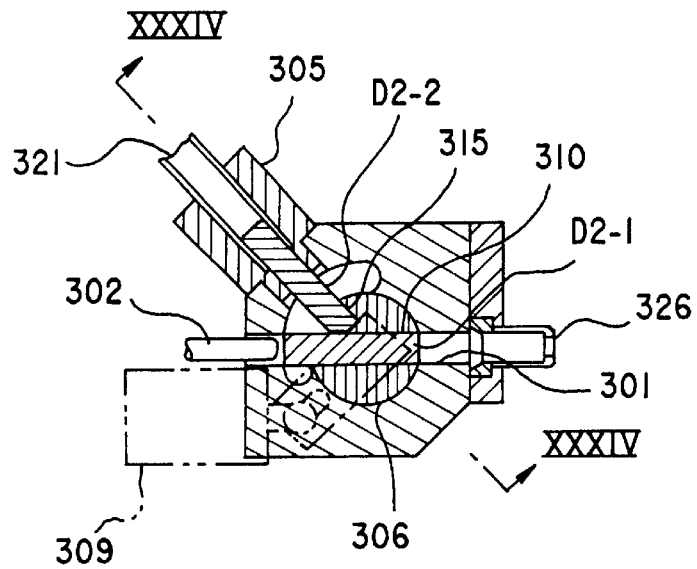
FIG. 33 is a cross-sectional side view showing the state of a dowel facing a shaft hole.

The selective feed device 305 is arranged as follows: A disk-shaped rotary member 306 is fit by means of a rotary shaft 307 in the middle of the shaft hole 301 in the head 300 to be rotatable about the horizontal axis which is orthogonal to the axis of the shaft hole 301. The rotary shaft 307 is disposed as shown in FIG. 30 with its left end exposed out of the head 300. A lever 308 is secured to the exposed left end of the rotary shaft 307 and extends downward. To the lower end (swinging end) of the lever 308 is connected a rod of a cylinder 309 attached to the outside of the head 300. As the cylinder 309 extends and retracts, the rotary member 306 rotates back and forth by a specified angle, within about 45 degree range in this example, about the horizontal axis intersecting the axis of the shaft 301 at right angles. The rotary member 306 is also provided with a delivery hole 310 bored through to permit passage of the dowels D1 and D2. The delivery hole 310 is formed in a position so as to become coaxial with the shaft hole 301 when the rotary member 306 is rotated counterclockwise from the position shown in FIG. 29 by about 45 degrees as shown in FIG. 33.

Figure 31:
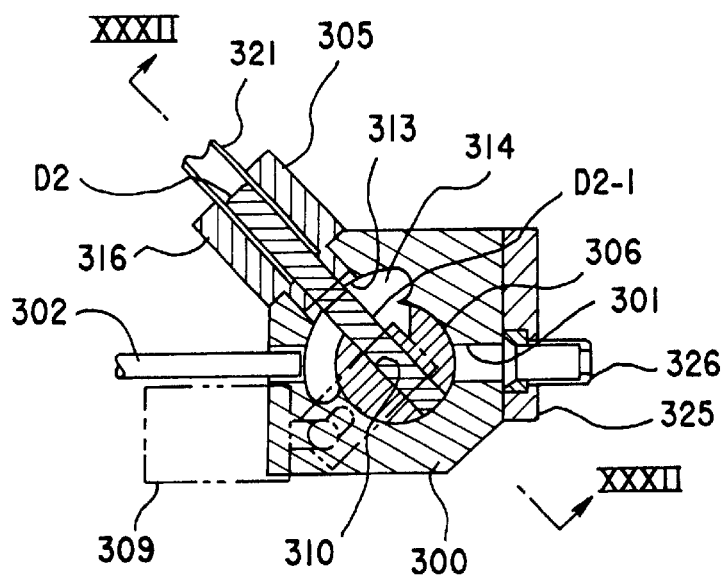
FIG. 31 is a cross-sectional side view showing the state of a dowel being supplied.
Figure 32:
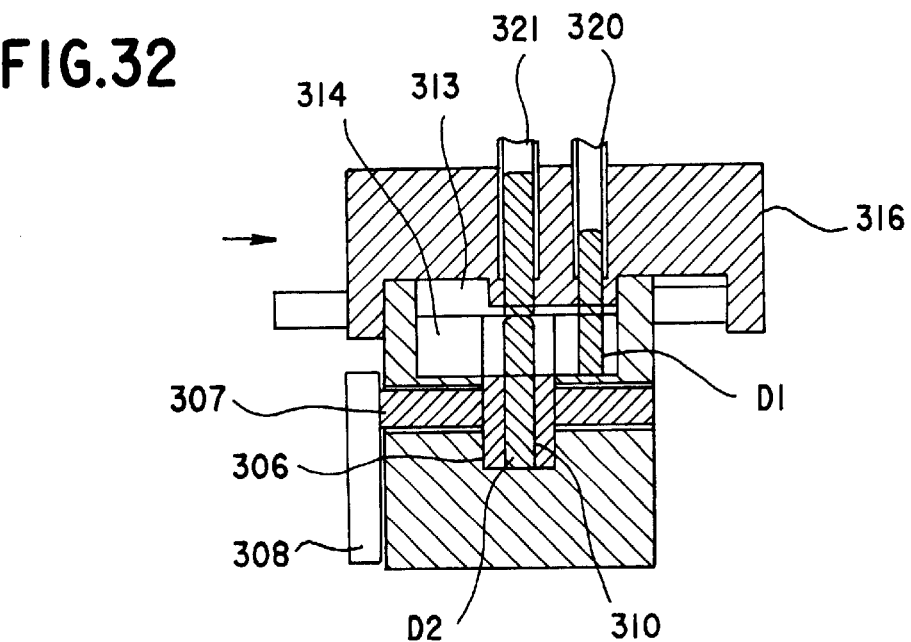
FIG. 32 shows a cross section XXXII—XXXII in FIG. 31.

A supply hole 313 communicating with the delivery hole 310 is formed in the peripheral upper part of the head 300. The supply hole 313 as shown in FIGS. 29 and 31 comes to a position opposite the inlet side of the delivery hole 310 when the rotary member 306 is rotated clockwise and its delivery hole 310 is tilted about 45 degrees relative to the shaft hole 301. The supply hole 313 is formed in the facing position elongate in the right-left (X-axis) direction as shown in FIGS. 30 and 32. A half-moon-shaped transfer passage 314 is formed, on the outlet (lower) side of the supply hole 313, extending over the rotation range on the inlet (upper) side of the delivery hole 310. The length of the transfer passage 314 in the right-left (X-axis) direction is made the same as that of the supply hole 313. The transfer passage 314 is for smoothly rolling the dowels D1 and D2 of a specified range of length (25 mm to 40 mm in this example) to the axis of the shaft hole 301 while reducing the diameter of the rotary member.

A cut-away recess 315 is formed in the outside circumferential part, on the inlet side of the delivery hole 310, of the rotary member 306. The cut-away recess 315 is made to run through in the right-left (X-axis) direction and its depth is made so that its bottom surface is in the same level with the bottom surface of the transfer passage 314, and that the dowels D1 and D2 of different diameters are smoothly switched to the inlet of the delivery hole 310 by the movement of the switching plate 316. The width of the cut-away recess 315 in the circumferential direction is made as shown in FIG. 33 that the lower end of the dowel D2-2 for a succeeding step can fit in when the delivery hole 310 causes the dowel D2-1 for the preceding step to be positioned coaxial with the shaft hole 301.

A switching plate 316 to be moved in the X-axis direction (right-left direction in FIG. 30) with a cylinder (not shown) is attached in the vicinity of the supply hole 313 part. First and second receiving holes 317 and 318 at a specified interval in the X-axis direction are bored in the switching plate 316. A first chute 320 for supplying small diameter (for example 6 mm) dowels D1 is connected to the first receiving hole 317, and a second chute 321 for supplying large diameter (for example 8 mm) dowels D2 is connected to the second receiving hole 318. The first receiving hole 317 is positioned so that it faces the receiving hole 310 when the switching plate 316 is moved from the state of FIG. 30 to the left. The second receiving hole 318 is positioned so that it faces the receiving hole 310 when the switching plate 316 is moved from the state of FIG. 30 to the right. The above arrangement may be made alternatively as follows: The switching plate 316 is made as a rotary plate. The first and second chutes 320 and 321, spaced in the circumferential direction, are connected to the peripheral part of the rotary plate. As the rotary plate is rotated by a specified angle, the first and second chutes 320 and 321 are chosen and caused to face the delivery hole 310.

To the front side of the head 300 is attached a front plate 325 to which is attached an ejection pipe 326 communicating coaxially with the front part of the shaft hole 301 and projecting forward. The ejection pipe 326 is made with the inside diameter of the front end part slightly smaller than that of the small diameter dowel D1, and with the front part peripheral wall projecting from the front plate 67 divided in the circumferential direction with slits. This makes it possible that, even if the diameters of the dowels coming to the ejection position are different, the dowels D1 (or D2) are aligned on the axis of the shaft hole 301 (dowel hole H) and smoothly passed when they are pushed with the shaft 302.

The dowel driving head device 60-5 of the fifth embodiment is operated as described below. For example, in the case the dowels D1 and D2 of different diameters of 6 mm and 8 mm and the same length of 25 mm are supplied to the first and second chutes 320 and 321, and the large diameter dowel D2 is driven, in the initial period as shown in FIGS. 29 and 30, the switching plate 316 is in the neutral position in the right-left direction, the first and second chutes 320 and 321 are on right and left outsides of the delivery hole 310. The rotary member 306 is rotated clockwise with the cylinder 309. As a result, the dowels D1-1 and D2-1 of different diameters in the forefront exposed from the first and second chutes 320 and 321 fit in the supply hole 313 and the transfer passage 314, with their lower ends in contact with the bottom surface of the transfer passage 314 in a standby state.

Figure 34:
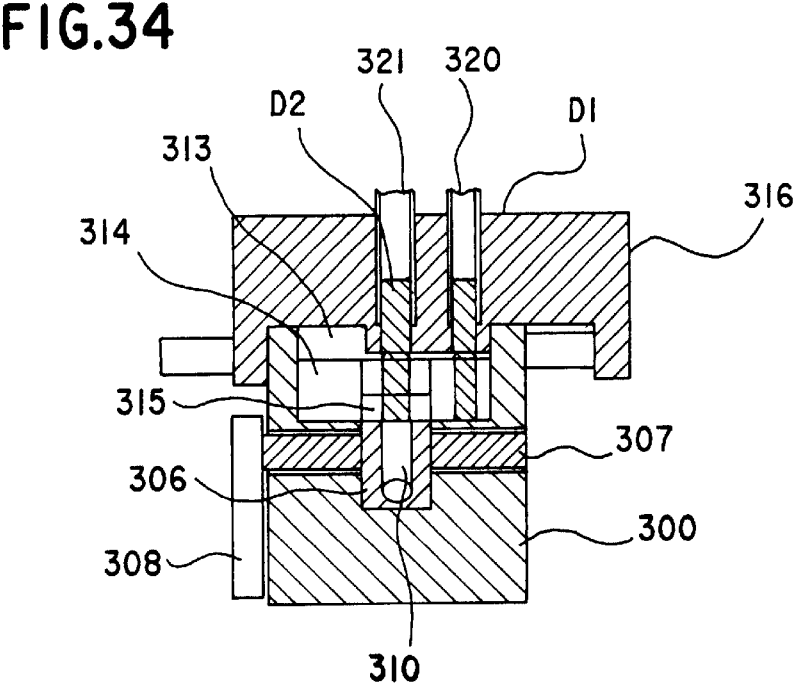
FIG. 34 shows a cross section VVVVI–XXXVI in FIG. 33.

When the large diameter dowel D2 is chosen in that state, as shown in FIGS. 31 and 32, the switching plate 316 is moved to the right as seen in FIG. 32, the second chute 321 aligns with the delivery hole 310, and the forefront dowel D2-1 fits in the delivery hole 310. Next, as shown in FIGS. 33 and 34, as the rotary member 306 is rotated with the cylinder 69 counterclockwise by about 45 degrees, the forefront dowel D2-1 in the delivery hole 310 is positioned coaxially with the shaft hole 301. Also, a dowel D2-2 of the succeeding step flows down by its own weight and fits in the supply hole 313 and the transfer passage 314, with their lower ends in contact with the bottom surface of the cut-away recess 315 of the rotary member 306 in a standby state.

Figure 35:
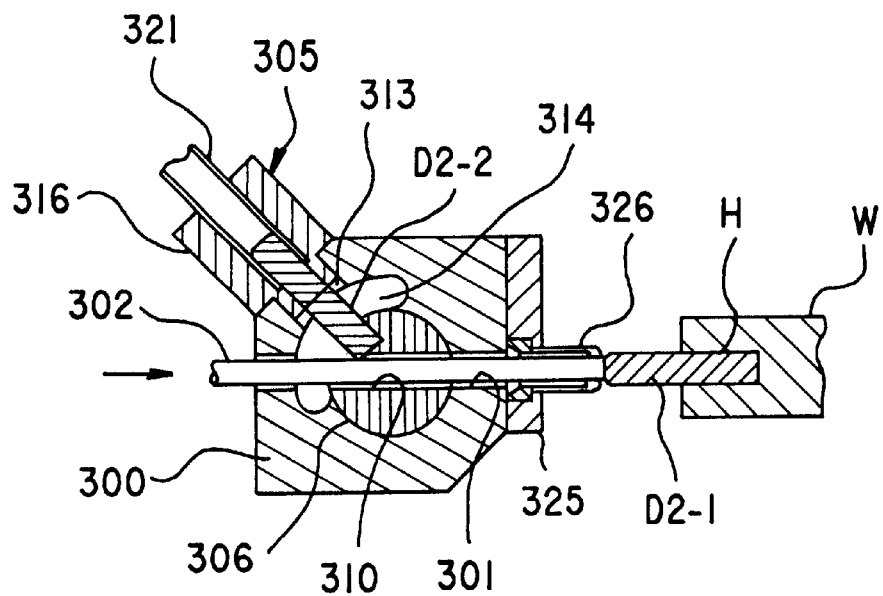
FIG. 35 is a cross-sectional side view showing the state of driving a dowel.
Figure 36:
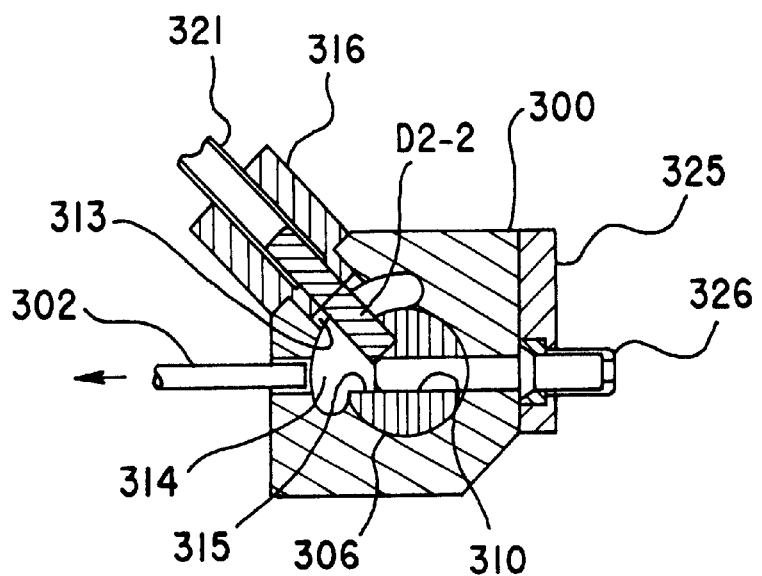
FIG. 36 is a cross-sectional side view showing the retraction state of the shaft immediately after driving a dowel.

In that state, as the shaft 302 moves forward, as shown in FIG. 35, the large diameter dowel D2-1 in the forefront is moved forward and ejected from the ejection pipe 326, and driven into the intended dowel hole H in the work W. In that case, since the front peripheral part of the ejection pipe 326 is divided in the circumferential direction and its inside front end diameter is made slightly smaller than the diameter of the small dowel D1, even if the diameters of the dowels D1 (or D2) reaching the ejection position are different, the dowels D1 (or D2) are accurately aligned with the dowel hole H axis and ejected. After driving the large diameter dowel D2-1, the shaft 302 retracts as shown in FIG. 36. Hereafter the above steps are repeated every time a succeeding step dowel D2 faces the dowel hole H to drive the dowels in succession. In the case the small diameter dowel D1 is driven, the switching plate 316 is moved from the (initial) state of FIG. 30 to the left to align the first chute 320 with the delivery hole 310 and, in that state, the rotary member 306 is operated in the same manner as described above.

What is claimed is:

1. A dowel driving head device comprising:
   a head, formed with a shaft hole, a plurality of receiving holes and a plurality of chutes for arranging different kinds of dowels in series and causing them to flow down, wherein downstream ends of each one of the plurality of chutes are singularly connected to a respective one of the plurality of receiving holes;
   a selective feed device, configured to select one of the dowels in one of the plurality of receiving holes and move the dowel onto an axis of the shaft hole; and
   a shaft, configured to fit in the shaft hole from a back side and drive out one of the dowels arriving on the axis of the shaft hole.

2. A dowel driving head device comprising:
   a head, formed with a shaft hole, a plurality of receiving holes at specified intervals along a circle centered on a front-rear axis parallel to each other and a plurality of chutes for arranging different kinds of dowels in series and causing them to flow down, wherein downstream ends of each one of the plurality of chutes are singularly connected to a respective one of the plurality of receiving holes;
   a rotary plate, centered on the front-rear axis in front of the head, wherein a through hole is formed in a peripheral part of the rotary plate;
   a selective feed device, adapted to rotate the rotary plate so that the through hole communicates by turns with the shaft hole and an intended receiving hole; and
   a shaft, configured to fit in the shaft hole from a back side and drive out one of the dowels arriving on the axis of the shaft hole.

3. A dowel driving head device as recited in claim 2, wherein a stopper device is provided to stop and release the dowels in the receiving holes.

4. A dowel driving head device as recited in claim 2, wherein transfer passages are formed in a front side part of the head and centered on the front-rear axis of the rotary plate to interconnect one of the plurality of receiving holes and the shaft hole.

5. A dowel driving head device as recited in claim 4, wherein detachable guides for restricting lateral movement of the dowels are attached on the receiving holes side of the transfer passages.

6. A dowel driving head device as recited in claim 4, wherein the transfer passages are formed to be gradually shallower from the receiving holes sides toward the shaft hole side.

7. A dowel driving head device as recited in claim 2, wherein the through hole is provided with an ejection pipe for one of the dowels to fit in and be held, and the ejection pipe comprising a cylindrical member with a front part formed with a diameter smaller than a diameter of one of the dowels, and a front circumferential wall of the cylindrical member divided in a circumferential direction with slits.

8. A dowel driving machine comprising:
a dowel driving head device comprising
a head, formed with a shaft hole, a plurality of receiving holes and a plurality of chutes for arranging different kinds of dowels in series and causing them to flow down, wherein downstream ends of each one of the plurality of chutes are singularly connected to a respective one of the plurality of the receiving holes;
a selective feed device, configured to select one of the dowels in one of the plurality of receiving holes and move the dowel onto an axis of the shaft hole;
a shaft, configured to fit in the shaft hole from a back side and drive out one of the dowels arriving on the axis of the shaft hole;
an X-axis moving table, wherein the X-axis moving table is configured to move along the rear part of a surface table on which a workpiece is placed;
vertical guide rods;
an attachment table supported for vertical sliding on the X-axis moving table through the vertical guide rods, wherein the attachment table is provided with a paste spouting device moving to and away from a dowel hole of the workpiece in a direction intersecting an axis of the dowel hole, and the dowel driving head device; and
an elevator device for vertically moving the attachment table.

9. A dowel driving machine comprising:
a dowel driving head device comprising
a head, formed with a shaft hole, a plurality of receiving holes and a plurality of chutes for arranging different kinds of dowels in series and causing them to flow down, wherein downstream ends of each one of the plurality of chutes are singularly connected to a respective one of the plurality of the receiving holes;
a selective feed device, configured to select one of the dowels in one of the plurality of receiving holes and move the dowel onto an axis of the shaft hole; and
a shaft, configured to fit in the shaft hole from a back side and drive out one of the dowels arriving on the axis of the shaft hole;
an X-axis-moving table, wherein the X-axis moving table is configured to move along the rear part of a surface table on which a workpiece is placed;
vertical guide rods;
an attachment table supported for vertical sliding on the X-axis moving table through the vertical guide rods, wherein the attachment table is provided with a hole drilling device for moving a plurality of drilling tools of different diameters individually to and away from a dowel hole of the workpiece in a direction intersecting an axis of the dowel hole, and the dowel driving head device; and
an elevator device for vertically moving the attachment table.

10. A dowel driving machine comprising:
a dowel driving head device comprising
a head, formed with a shaft hole, a plurality of receiving holes at specified intervals along a circle centered on a front-rear axis parallel to each other and a plurality of chutes for arranging different kinds of dowels in series and causing them to flow down, wherein downstream ends of each one of the plurality of chutes are singularly connected to a respective one of the plurality of receiving holes;
a rotary plate, centered on the front-rear axis in front of the head, wherein a through hole is formed in a peripheral part of the rotary plate, and the through hole is fitted with an ejection pipe for the dowels to fit in and be held, the ejection pipe comprising a cylindrical member with a front part formed with a diameter smaller than a diameter of one of the dowels, and a front circumferential wall of the cylindrical member divided in a circumferential direction with slits;
a selective feed device, adapted to rotate the rotary plate so that the through hole communicates by turns with the shaft hole and an intended receiving hole;
a shaft, configured to fit in the shaft hole from a back side and drive out one of the dowels arriving on the axis of the shaft hole;
an X-axis moving table, wherein the X-axis moving table is configured to move along the rear part of a surface table on which a workpiece is placed;
vertical guide rods;
an attachment table supported for vertical sliding on the X-axis moving table through the vertical guide rods, wherein the attachment table is provided with a paste spouting device moving to and away from a dowel hole of the workpiece in a direction intersecting an axis of the dowel hole, and the dowel driving head device; and
an elevator device for vertically moving the attachment table.

11. A dowel driving machine comprising:
a dowel driving head device comprising
a head, formed with a shaft hole, a plurality of receiving holes at specified intervals along a circle centered on a front-rear axis parallel to each other and a plurality of chutes for arranging different kinds of dowels in series and causing them to flow down, wherein downstream ends of each one of the plurality of chutes are singularly connected to a respective one of the plurality of receiving holes;
a rotary plate, centered on the front-rear axis in front of the head, wherein a through hole is formed in a peripheral part of the rotary plate, and the through hole is fitted with an ejection pipe for the dowels to fit in and be held, the ejection pipe comprising a cylindrical member with a front part formed with a diameter smaller than a diameter of the dowels, and with a front circumferential wall of the cylindrical member divided in a circumferential direction with slits;
a selective feed device adapted to rotate the rotary plate so that the through hole communicates by turns with the shaft hole and an intended receiving hole;

a shaft configured to fit in the shaft hole from a back side and drive out one of the dowels arriving on the axis of the shaft hole;

an X-axis moving table, wherein the X-axis moving table is configured to move along the rear part of a surface table on which a workpiece is placed;

vertical guide rods;

an attachment table supported for vertical sliding on the X-axis moving table through the vertical guide rods, wherein the attachment table is provided with a hole drilling device for moving a plurality of drilling tools of different diameters individually to and away from a dowel hole of the workpiece in a direction intersecting an axis of the dowel hole, and the dowel driving head device; and an elevator device for vertically moving the attachment table.

* * * * *